(12) United States Patent
Orsino et al.

(10) Patent No.: US 11,671,231 B2
(45) Date of Patent: *Jun. 6, 2023

(54) BANDWIDTH PART SWITCHING AND PHY CONFIGURATION ALIGNMENT

(71) Applicant: Telefonaktiebolaget LM Ericsson (publ), Stockholm (SE)

(72) Inventors: Antonino Orsino, Masala (FI); Osman Nuri Can Yilmaz, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/337,945

(22) Filed: Jun. 3, 2021

(65) Prior Publication Data

US 2021/0288780 A1 Sep. 16, 2021
US 2022/0271904 A9 Aug. 25, 2022

Related U.S. Application Data

(63) Continuation of application No. 16/334,514, filed as application No. PCT/SE2019/050136 on Feb. 15, 2019, now Pat. No. 11,057,184.

(Continued)

(51) Int. Cl.
*H04L 5/00* (2006.01)
*H04L 1/00* (2006.01)
(Continued)

(52) U.S. Cl.
CPC .......... *H04L 5/0094* (2013.01); *H04L 1/0026* (2013.01); *H04L 5/0051* (2013.01); *H04L 25/0226* (2013.01); *H04W 80/02* (2013.01)

(58) Field of Classification Search
CPC ..... H04W 80/02; H04L 1/0026; H04L 5/0051
(Continued)

(56) References Cited

U.S. PATENT DOCUMENTS 9,673,945 B2 6/2017 Geirhofer et al.
10,743,238 B2 8/2020 Chen et al.
(Continued)

FOREIGN PATENT DOCUMENTS

CN 103460634 A 12/2013
CN 105103640 A 11/2015
(Continued)

OTHER PUBLICATIONS

3GPP, "3rd Generation Partnership Project; Technical Specification Group Radio Access Network; NR; Medium Access Control (MAC) protocol specification (Release 15)", 3GPP TS 38.321 V15.4.0, Dec. 2018, 1-77.
(Continued)

*Primary Examiner* — Angel T Brockman
(74) *Attorney, Agent, or Firm* — Murphy, Bilak & Homiller, PLLC

(57) ABSTRACT

According to an aspect, a wireless device is configured to selectively operate in one of two or more previously configured bandwidth parts (BWPs), each BWP being a different subset of an available bandwidth for uplink and/or downlink operation. The wireless device receives an indication to switch from use of a first BWP to a second BWP, and after switching to use of the second BWP, applies a predetermined default configuration, corresponding to the second BWP, to one or more physical layer parameters and/or procedures.

15 Claims, 22 Drawing Sheets

Related U.S. Application Data

(60) Provisional application No. 62/631,230, filed on Feb. 15, 2018.

(51) Int. Cl.
*H04L 25/02* (2006.01)
*H04W 80/02* (2009.01)

(58) Field of Classification Search
USPC .......................................................... 370/329
See application file for complete search history.

(56) References Cited

U.S. PATENT DOCUMENTS

| | | | |
|---|---|---|---|
| 2015/0318954 | A1 | 11/2015 | Park et al. |
| 2017/0063479 | A1 | 3/2017 | Kim et al. |
| 2017/0366328 | A1 | 12/2017 | Seo et al. |
| 2019/0207737 | A1* | 7/2019 | Babaei .................. H04W 76/11 |
| 2019/0349983 | A1* | 11/2019 | Loehr .................... H04L 1/1819 |
| 2020/0127799 | A1* | 4/2020 | Orsino .................. H04L 5/0051 |

FOREIGN PATENT DOCUMENTS

| | | |
|---|---|---|
| CN | 107493605 A | 12/2017 |
| JP | 2021503231 A | 2/2021 |
| KR | 20140071480 A | 6/2014 |
| KR | 20150115945 A | 10/2015 |
| KR | 20160039144 A | 4/2016 |
| RU | 2637779 C2 | 12/2017 |
| WO | 2017027055 A1 | 2/2017 |
| WO | 2019099817 A1 | 5/2019 |

OTHER PUBLICATIONS

3GPP, "3rd Generation Partnership Project; Technical Specification Group Radio Access Network; NR; Requirements for support of radio resource management (Release 15)", 3GPP TS 38.133 V15.4.0, Dec. 2018, 1-862.

Unknown, Author, "Clarifications on BWP set configuration", 3GPP TSG-RAN WG2 #100, R2-1713729, Reno, USA, Nov. 27-Dec. 1, 2017, 1-4.

Unknown, Author, "CSI measurement for dynamic BWP switching", 3GPP TSG RAN WG1 Meeting AH 1801, R1-1800580, Vancouver, Canada, Jan. 22-26, 2018, 1-3.

Unknown, Author, "Details of BWP switching operation", 3GPP TSG RAN WGI Meeting AHI801, RI-1800603, Vancouver, Canada, Jan. 22-26, 2018, 1-4.

Unknown, Author, "Other aspects on bandwidth Parts", 3GPP TSG RAN WG1 Meeting 91, R1-1719800, Reno, USA, Nov. 27-Dec. 1, 2017, 1-7.

Unknown, Author, "Remaining issues and text proposals on SRS design", 3GPP TSG RAN WG1 Meeting AH 1801, R1-1800192, Vancouver, Canada, Jan. 22-26, 2018, 1-7.

Unknown, Author , "Cell and BWP relation", 3GPP TSG-RAN WG2 #99bis R2-1711065, Prague, Czech Republic, Oct. 9-13, 2017, 1-7.

Unknown, Author , "RRC configuration framework for BWP", 3GPP TSG-RAN WG2 Meeting #AH1801, R2-1800445, Vancouver, Canada, Jan. 22-26, 2018, 1-14.

\* cited by examiner

BANDWIDTH PART SWITCHING AND PHY CONFIGURATION ALIGNMENT

TECHNICAL FIELD

The present disclosure generally relates to the field of wireless network communications, and more particularly, to wireless devices configured to selectively operate in one of two or more previously configured bandwidth parts (BWPs), each BWP being a different subset of an available bandwidth for uplink and/or downlink operation.

BACKGROUND

Bandwidth parts (BWP) With Bandwidth Adaptation (BA), the receive and transmit bandwidth of a user equipment (UE) need not be as large as the bandwidth of the cell and can be adjusted. The width can be ordered to change (e.g., to shrink during periods of low activity to save power), the location can move in the frequency domain (e.g., to increase scheduling flexibility) and the subcarrier spacing can be ordered to change (e.g., to allow different services). A subset of the total cell bandwidth of a cell is referred to as a Bandwidth Part (BWP) and BA is achieved by configuring the UE with BWPs and telling the UE which of the configured BWPs is currently the active one.

FIG. 1 shows an example of a bandwidth part scenario, where 3 different BWPs are configured: $BWP_1$ with a width of 40 MHz and subcarrier spacing of 15 kHz; $BWP_2$ with a width of 10 MHz and subcarrier spacing of 15 kHz; and $BWP_3$ with a width of 20 MHz and subcarrier spacing of 60 kHz.

To enable BA on the primary cell (PCell), the gNB configures the UE with uplink and downlink BWPs. To enable BA on secondary cells (SCells), when carrier aggregation (CA) is in use, the gNB configures the UE with at least downlink BWPs on the SCells. In other words, there may be no uplink BWPs, in some cases. For the PCell, the initial BWP is the BWP used for initial access. For the SCells, the initial BWP is the BWP configured for the UE to first operate at SCell activation.

In frequency division duplex (FDD) operation, the BWP for downlink and uplink can be switched independently of one another. In time division duplex (TDD) operation, the BWP for downlink and uplink is switched simultaneously. Switching between configured BWPs happens by means of downlink control information (DCI) or an inactivity timer (L1 signaling). When an inactivity timer is configured for a serving cell, the expiry of the inactivity timer associated with that cell switches the active BWP to the default one. If a default BWP is not explicitly configured for a serving cell, the initial BWP takes the role of the default BWP for that serving cell.

To enable reasonable UE battery consumption when BA is configured, only one BWP pair can be active at a time, all other BWPs that the UE is configured with being deactivated. On deactivated BWPs, the UE does not monitor the physical downlink control channel (PDCCH), does not transmit on the physical uplink control channel (PUCCH), physical random access channel (PRACH) and uplink shared channel (UL-SCH).

MAC Control Elements (MAC CE)

MAC control elements (MAC CE) are control commands within the MAC layer, exchanged between the UE and the network. These special MAC structures carrying the control information are implemented as a special bit string in the logical channel ID (LCID) field of a MAC Header (see 3GPP TS 38.321). There are several MAC CEs in downlink MAC and also several MAC CEs in uplink MAC.

The network may activate and deactivate the configured channel state information reference signal (CSI-RS) resources of a serving cell by sending the Activation/Deactivation of CSI-RS resources MAC control element.

For semi-persistent reporting on the physical uplink shared channel (PUSCH), a set of semi-persistent CSI report settings are configured, by higher layers, and the CSI request field in a DCI command activates one of the semi-persistent CSI reports.

For semi-persistent reporting on PUCCH, a set of semi-persistent CSI report settings are configured, by higher layers, with the PUCCH resource used for transmitting the CSI report. Semi-persistent reporting on PUCCH is activated by a MAC CE activation command, which selects one of the semi-persistent CSI Report settings for use by the UE on the PUCCH.

When a UE with the higher layer parameter ResourceConfigType set to "semi-persistent" receives a MAC CE activation command for CSI-RS resources for channel measurement and CSI-interference measurement (IM)/non-zero power (NZP) CSI-RS resources for interference measurement associated with configured CSI resource settings in slot n, the corresponding actions in 3GPP TS 38.321 and the UE assumptions (including quasi-co-location assumptions provided by a reference to a TCI-RS-SetConfig) on CSI-RS/CSI-IM transmission corresponding to the configured CSI-RS/CSI-IM resource configurations shall be applied no later than the minimum requirement defined in 3GPP TS 38.133. When a UE receives a MAC CE deactivation command as described in 3GPP TS 38.321 for activated CSI-RS/CSI-IM resources associated with configured CSI resource settings in slot n, the corresponding actions in 3GPP TS 38.321 and UE assumption on cessation of CSI-RS/CSI-IM transmission corresponding to the deactivated CSI-RS/CSI-IM resources shall apply no later than the minimum requirement defined in 3GPP TS 38.133. The UE may assume that the CSI-RS resources for channel measurement and the CSI-IM/NZP CSI-RS resources for interference measurement are spatially quasi co-located. It is worth noting that a similar procedure may be applied also when configuring sounding reference signal (SRS) resources and transmission configuration indication (TCI)-States (i.e., for antenna ports quasi-colocation).

In 5G NR, MAC CE commands are used for PDSCH and PUSCH related procedures. For instance, a UE can be configured with higher layer signaling for up to M TCI-States to decode PDSCH according to a detected PDCCH, with DCI intended for the UE and the given serving cell, where M depends on the UE capability. How these TCI-States are configured and activated is performed through a MAC CE command (i.e., in 3GPP TS 38.321) used to map up to 8 TCI states to the codepoints of the DCI field TCI-states.

Further, semi-persistent CSI reporting can be activated/deactivated through MAC CE commands. In fact, a CSI reporting triggering state can be associated with either candidate downlink BWP. However, a UE is not expected to be triggered with a CSI report for a non-active downlink BWP. Also, the UE can be configured with one or more SRSs linked to each BWP.

A UE can be configured for operation using only a part of the total cell bandwidth, with this being referred to as a BWP. The maximum number of supported BWPs is currently 4. Different PDSCH and PUSCH procedures may be configured for each of the BWPs. However, in the case where the UE is configured to switch from one BWP to another (this is done through L1 signaling), there could be possible alignment issues with respect to the physical layer procedures and associated parameters configured, since those are activated/deactivated by using MAC CE commands.

Currently, in the standardization of NR, an open issue with respect to the use of BWPs is the relation between the BWP switching and the operation related to various physical layer procedures/parameters, e.g., regarding CSI-RS and SRS, which are controlled via MAC CE commands So far, those MAC CE controlled parameters and procedures are associated with a single BWP. In the event that the UE is indicated to switch the currently active BWP, the previously activated CSI-RS report or SRS configuration might be invalid for the new "active" BWP. Further, the UE is not allowed to send PHY reports to a BWP that is not active anymore—thus, it may also happen that no PHY report is received by the network once that the UE switches to a new BWP. Therefore, the UE may provide invalid reporting to the network as a result of the misalignment between the currently "active" BWP and the physical layer procedures configured for the previously "active" BWP. This problem may apply to any or all of the physical procedures/parameters that can be toggled by MAC CEs.

SUMMARY

The misalignment of the active BWP and associated physical layer configuration results in suboptimal performance and possible erroneous behavior. Embodiments of the present invention prevent this misalignment between the active BWP and related physical layer procedures that may arise due to BWP switching. This keeps the NR performance at the expected level.

According to the presently disclosed techniques, when the UE is to switch from one active BWP to another (through L1 signaling from the network), three possible actions may be performed if no MAC CE change is intended. Upon the receiving of a BWP switching indication, the UE reverts to a default BWP configuration for physical layers procedures and associated parameters for that BWP, as indicated by means of a Radio Resource Control (RRC) message previously (e.g., in RRC reconfiguration/RRC resume/RRC connection setup), until it receives a new MAC CE from the network. Upon the receiving of a BWP switching indication, the UE stops physical layer procedures configured previously via MAC CE (e.g., regarding CSI-RS, SRS) and waits for a new MAC CE to be sent by the network. In a variation of this approach, the UE starts a timer upon receiving the BWP switching indication and, if no MAC CE is received before the timer expires, the UE reverts to the default BWP configuration for PHY layer parameters and/or procedures for that BWP, until it receives a new MAC CE from the network. Upon the receiving of a BWP switching indication, the UE reverts to the physical procedures configuration that applied when the UE last used the newly active BWP.

According to some embodiments, a method, in a wireless device (e.g., UE) configured to selectively operate in one of two or more previously configured BWPs, where each BWP is a different subset of an available bandwidth for uplink and/or downlink operation. The method includes receiving an indication to switch from use of a first BWP to a second BWP, and after switching to use of the second BWP, applying a predetermined default configuration, corresponding to the second BWP, to one or more physical layer parameters and/or procedures.

According to some embodiments, a method, in a wireless device configured to selectively operate in one of two or more previously configured BWPs, each BWP being a different subset of an available bandwidth for uplink and/or downlink operation. The method includes receiving an indication to switch from use of a first BWP to a second BWP and determining whether physical layer parameters and/or procedures for the second BWP have previously been configured by MAC CEs during prior use of the second BWP. The method includes applying the previously configured physical layer parameters and/or procedures for the second BWP upon determining that the physical layer parameters and/or procedures for the second BWP have previously been configured by MAC CEs during prior use of the second BWP.

According to some embodiments, a method, in a wireless device configured to selectively operate in one of two or more previously configured BWPs, each BWP being a different subset of an available bandwidth for uplink and/or downlink operation. The method includes receiving an indication to switch from use of a first BWP to a second BWP, and upon switching to use of the second BWP, stopping operation of one or more physical layer procedures until receipt of a command activating and/or configuring the stopped one or more physical layer procedures for the second BWP.

According to some embodiments, a method, in a wireless device configured to selectively operate in one of two or more previously configured BWPs, each BWP being a different subset of an available bandwidth for uplink and/or downlink operation. The method includes receiving an indication to switch from use of a first BWP to a second BWP, and upon switching to use of the second BWP, stopping operation of one or more physical layer procedures and waiting a predetermined time for receipt of a command activating and/or configuring the stopped one or more physical layer procedures for the second BWP. The method also includes, upon failing to receive a command activating and/or configuring the stopped one or more physical layer procedures for the second BWP, within the predetermined time, switching to use of a default BWP of the two or more previously configured BWPs and applying a predetermined default configuration, corresponding to the default BWP, to one or more physical layer parameters and/or procedures.

According to some embodiments, a method in a network node serving a wireless device configured to selectively operate in one of two or more previously configured BWPs, where each BWP is a different subset of an available bandwidth for uplink and/or downlink operation, includes sending, to the wireless device, an indication to switch from use of a first BWP to a second BWP and counting a number of physical layer reports expected from the wireless device during use of the second BWP but not received. The method includes, responsive to the number reaching a predetermined limit, sending one or more MAC CEs to configure physical layer reporting for the second BWP.

According to some embodiments, a wireless device configured to selectively operate in one of two or more previously configured BWPs, each BWP being a different subset of an available bandwidth for uplink and/or downlink operation, includes transceiver circuitry configured for communicating with a network node of a wireless communication network and processing circuitry operatively associated with the transceiver circuitry. The processing circuitry is configured to receive an indication to switch from use of a first BWP to a second BWP and, after switching to use of the second BWP, apply a predetermined default configuration, corresponding to the second BWP, to one or more physical layer parameters and/or procedures.

According to some embodiments, a wireless device configured to selectively operate in one of two or more previously configured BWPs, each BWP being a different subset of an available bandwidth for uplink and/or downlink operation, includes transceiver circuitry configured for communicating with a network node of a wireless communication network and processing circuitry operatively associated with the transceiver circuitry. The processing circuitry is configured to receive an indication to switch from use of a first BWP to a second BWP and determine whether physical layer parameters and/or procedures for the second BWP have previously been configured by MAC CEs during prior use of the second BWP. The processing circuitry is also configured to apply the previously configured physical layer parameters and/or procedures for the second BWP upon determining that the physical layer parameters and/or procedures for the second BWP have previously been configured by MAC CEs during prior use of the second BWP.

According to some embodiments, a wireless device configured to selectively operate in one of two or more previously configured BWPs, each BWP being a different subset of an available bandwidth for uplink and/or downlink operation, includes transceiver circuitry configured for communicating with a network node of a wireless communication network and processing circuitry operatively associated with the transceiver circuitry. The processing circuitry is configured to receive an indication to switch from use of a first BWP to a second BWP, and upon switching to use of the second BWP, stop operation of one or more physical layer procedures until receipt of a command activating and/or configuring the stopped one or more physical layer procedures for the second BWP.

According to some embodiments, a wireless device configured to selectively operate in one of two or more previously configured BWPs, each BWP being a different subset of an available bandwidth for uplink and/or downlink operation, includes transceiver circuitry configured for communicating with a network node of a wireless communication network and processing circuitry operatively associated with the transceiver circuitry. The processing circuitry is configured to receive an indication to switch from use of a first BWP to a second BWP, and upon switching to use of the second BWP, stop operation of one or more physical layer procedures and waiting a predetermined time for receipt of a command activating and/or configuring the stopped one or more physical layer procedures for the second BWP. The processing circuitry is also configured to, upon failing to receive a command activating and/or configuring the stopped one or more physical layer procedures for the second BWP, within the predetermined time, switch to use of a default BWP of the two or more previously configured BWPs and apply a predetermined default configuration, corresponding to the default BWP, to one or more physical layer parameters and/or procedures.

A network node configured to serve a wireless device configured to selectively operate in one of two or more previously configured BWPs, each BWP being a different subset of an available bandwidth for uplink and/or downlink operation, includes transceiver circuitry configured for communicating with the wireless device and processing circuitry operatively associated with the transceiver circuitry. The processing circuitry is configured to send, to the wireless device, an indication to switch from use of a first BWP to a second BWP and count a number of physical layer reports expected from the wireless device during use of the second BWP but not received. The processing circuitry is configured to, responsive to the number reaching a predetermined limit, send one or more MAC CEs to configure physical layer reporting for the second BWP.

Further aspects of the present invention are directed to an apparatus, computer program products or computer readable storage medium corresponding to the methods summarized above and functional implementations of the above-summarized apparatus and wireless device.

Of course, the present invention is not limited to the above features and advantages. Those of ordinary skill in the art will recognize additional features and advantages upon reading the following detailed description, and upon viewing the accompanying drawings.

DETAILED DESCRIPTION OF EMBODIMENTS

Figure 1:
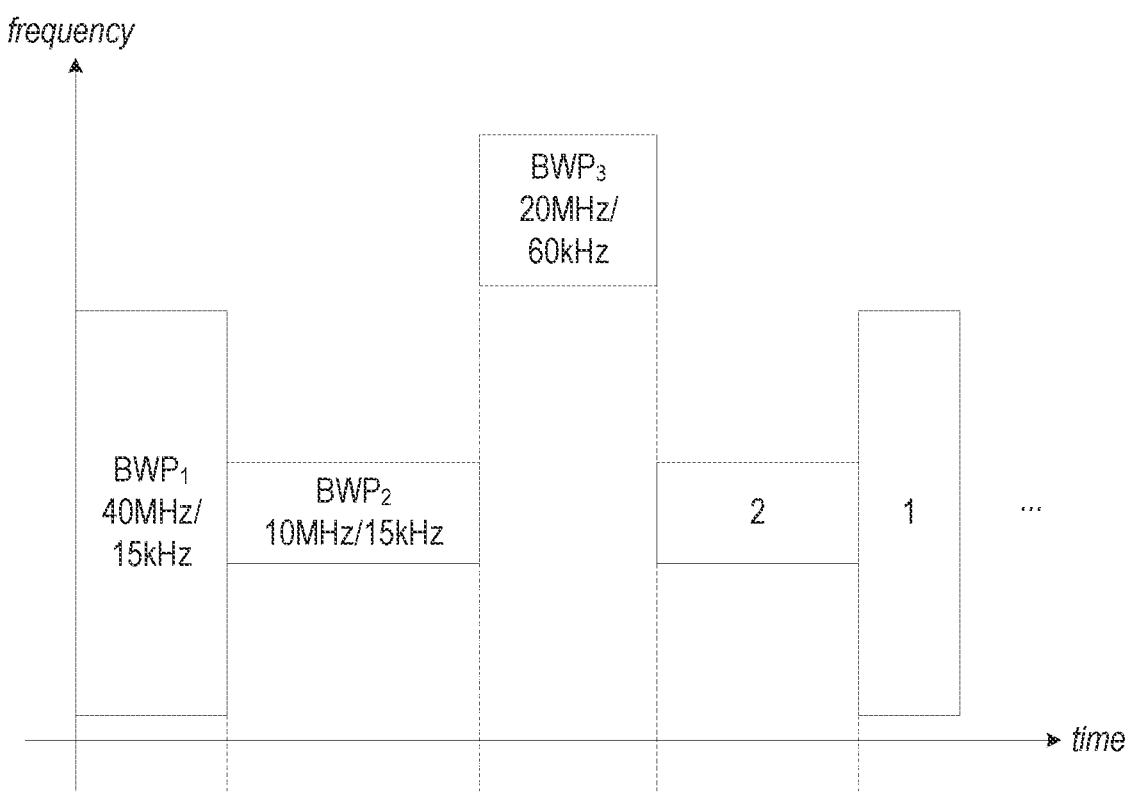
FIG. 1 illustrates an example of a BWP scenario.

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment.

Standardization of BWP operation, in the 3$^{rd}$ Generation Partnership Project (3GPP), is ongoing. As part of that specification, information elements (IEs), such as a ServingCellConfigCommon IE may be used to configure cell-specific parameters of a UE's serving cell, including, for example, an initial downlink BWP. The IE contains parameters which a UE would typically acquire from Standard Signal Block (SSB), Master Information Block (MIB) or System Information Blocks (SIBs) when accessing the cell from IDLE. With this IE, the network provides this information in dedicated signaling when configuring a UE with SCells or with an additional cell group (SCG). It also provides it for Special Cells (SpCells) (Master Cell Group and Secondary Cell Group) upon reconfiguration with synchronization. The ServingCellConfig IE may be used to configure (add or modify) the UE with a serving cell, which may be the SpCell or an SCell of an MCG or SCG. This may involve specifying initial downlink BWPs (common and dedicated), initial uplink BWPs (common and dedicated), a first active downlink BWP, a duration or timer after which the UE falls back to a default BWP, and a default downlink BWP.

The BandwidthPart-Config IE information element involves configuration of a BWP. This IE can include an identifier, frequency domain location and bandwidth. The location is given as a distance (in number of physical resource blocks) in relation to the lowest usable subcarrier with the same subcarrier spacing as the BWP. The IE may specify uplink and downlink BWPs, whether common or dedicated, for physical channels. Conditions may also be specified.

PHY layer procedures activated/deactivated by MAC CE include semi-persistent CSI-RS reporting, the procedures and/or parameters for which may vary on a per BWP basis. Further, the UE can be configured through MAC CE with one or more SRS resources per BWP. Another procedure with which the UE can be configured on a per BWP basis is the TCI state (one or more) in order to decode PDSCH according to a detected PDCCH. However, as described above, there may be misalignment between these procedures and a new active BWP when BWP switching happens. Further, the UE is not allowed to send PHY reports to a BWP that is not active anymore. Thus, it may also happen that no PHY report is received by the network once the UE switches to a new BWP. The techniques disclosed herein address UE behaviors and configurations that may resolve this issue.

In one of the embodiments disclosed, a UE is configured by the network with default PHY layer procedures (e.g., CSI-RS, SRS reports), either on a dedicated basis, for each possible BWP, or on a common basis, for all BWPs.

In some embodiments, the default configuration can be signaled by means of RRC. The RRC messages that may contain or indicate the default configuration could be RRC reconfiguration, RRC resume, or RRC connection setup messages.

In some of these embodiments, the default PHY layer configuration may be immediately applied and used when the active BWP is changed from, e.g., BWPa to BWPb. This way, a possible misalignment of the new active BWP and the previously configured PHY layer procedures and associated parameters, which are configured by MAC CE, can be avoided.

In another approach according to the presently disclosed techniques, the UE may not have any default PHY layer configuration for BWPs. According to this approach, the UE may stop previously configured PHY layer procedures (i.e., one or more of those that are activated/deactivated and/or configured by MAC CE) upon BWP switching, and wait for a new MAC CE command for the new active BWP.

In still another approach, the UE starts a timer (e.g., MacCeBWPTimer) upon BWP switching and, when the maximum value is reached and no new MAC CE command has been received by the UE, the UE reverts to the default PHY layer configuration for the newly active BWP. Alternatively, the UE may, in some embodiments, revert to the default BWP, with its associated default PHY layer configuration, upon expiration of the timer with no receipt of a MAC CE command configuring the PHY layer parameters or procedures. Alternatively, the UE can apply Radio Link Failure (RLF) and/or re-establishment procedures upon expiration of the timer (e.g., if there is no default configuration for the newly active BWP).

In a network-based approach that can be used with several of the above UE-based techniques, after the network sends a DCI command to the UE for switching from a first BWP, e.g., "BWPa" to a second BWP, e.g., "BWPb," or when the network sends a PHY layer configuration for BWPb within a MAC CE, the network could start a counter where the not-received PHY layer reports are counted. Here, the PHY layer reports can involve CSI-RS, SRS, TCI-States, or other L1 information. Once the counter reaches the maximum value, the network then re-sends the MAC CE to configure the PHY layer procedures for the new BWP.

In some embodiments, whether or not there is a default PHY layer configuration for the new BWP, if the UE has previously used the same active BWP, it can revert to the PHY layer procedures and associated parameters previously configured (by MAC CE) for the same BWP. In other words, the previous MAC CE indication/configuration for the same BWP can be reused as a default PHY layer configuration when it is configured for the next time. Put another way, once a PHY layer configuration for a given BWP is made, it can be considered as the default configuration for that BWP until it is altered, in some embodiments.

In some embodiments according to this previous approach, this reversion to a previous configuration for a given BWP may be valid only temporarily, for instance, if the UE did not have a state transition from active to idle (or inactive) and a handover to another cell (or BS), or either of these. In some of these embodiments, the UE may revert to a configured default outside of this validity period, if one is available.

Figure 2:
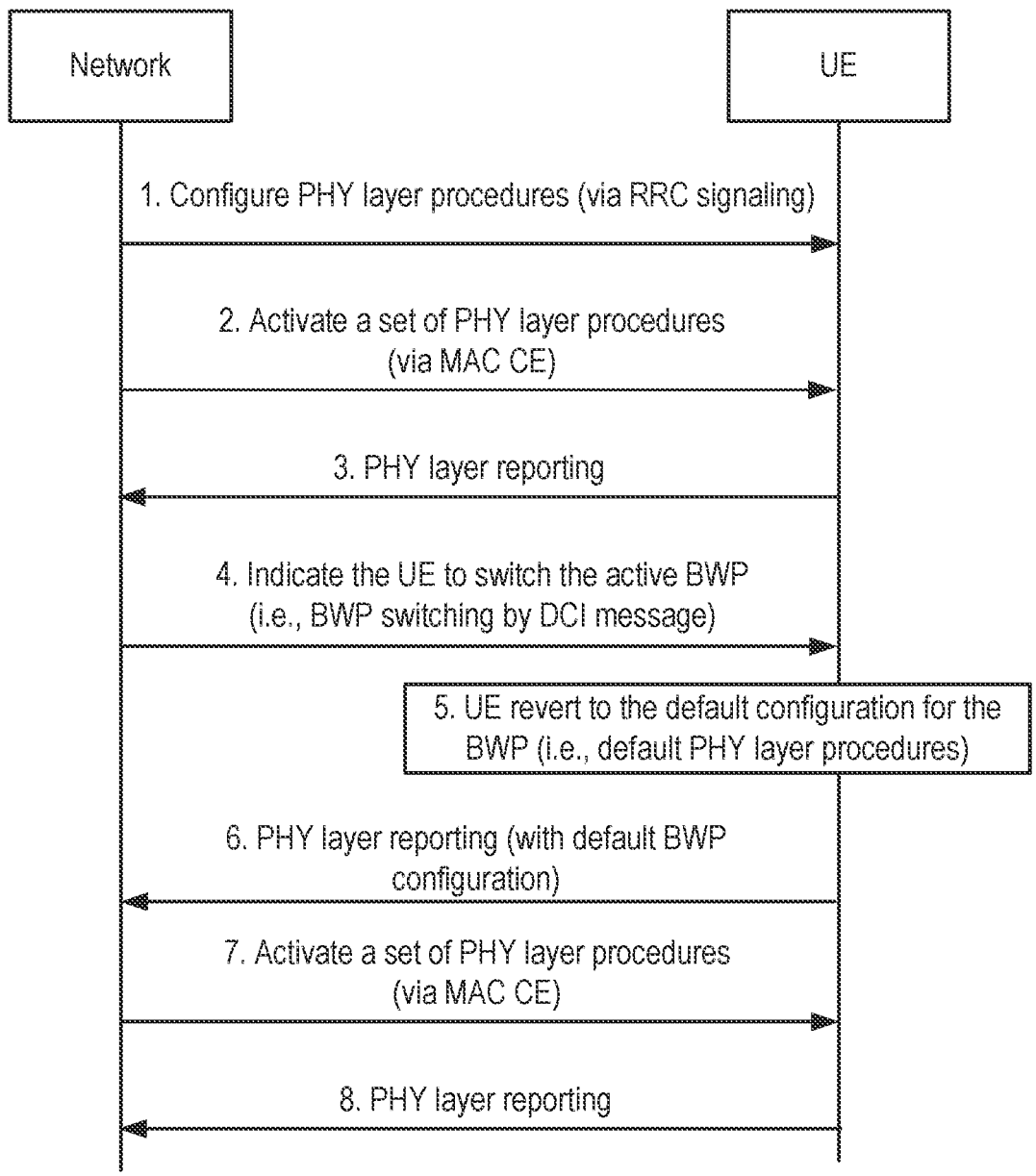
FIG. 2 illustrates an example signal flow, where upon BWP switching, the UE reverts to default PHY layer configuration for the BWP, according to some embodiments.

FIG. 2 illustrates a signaling flow where, upon BWP switching, the UE reverts to default PHY layer configuration for the BWP. According to the example procedure shown in FIG. 2, once a set of PHY layer procedures/parameters is configured (step 1) and then one of them is activated via MAC CE (step 2), the UE starts to send PHY layer reporting to the network. The PHY layer reporting types can be configured as CSI-RS, SRS, TCI-States, or other L1 information reporting. Further, all this reporting can be configured for a single BWP.

In the illustrated example, once the network sends a DCI command to the UE (L1 signaling) to change the "active" BWP, as shown at step 4, the UE, to avoid misalignment due to the PHY layer reporting linked to the old BWP, autonomously reverts to the default configuration for the BWP, as shown at steps 5 and 6. Reverting to the default configuration for the BWP implies that also PHY layer procedures/parameters related to this BWP are used. In the illustrated procedure, the network subsequently explicitly activates a set of PHY layer procedures, via MAC CE, as shown at step 7, after which the subsequent PHY layer reporting, at step 8, is performed according to the newly activated procedures.

Figure 3:
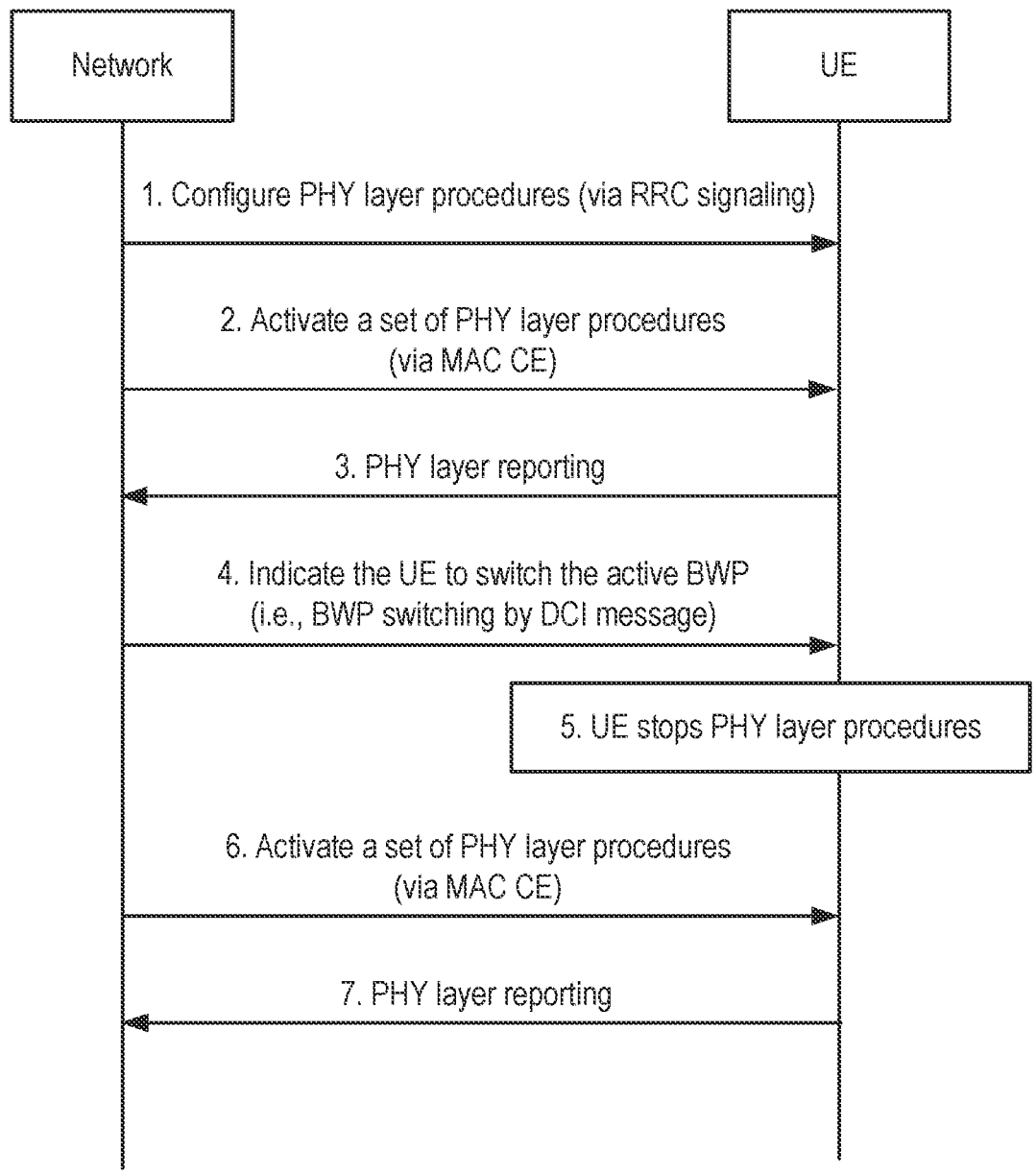
FIG. 3 illustrates an example signal flow, where upon BWP switching, the UE stops PHY layer procedures and waits for a new MAC CE, according to some embodiments.

FIG. 3 illustrates a signaling flow, where upon BWP switching, the UE stops PHY layer procedures and waits for a new MAC CE. According to the example procedure shown in FIG. 3, once a set of PHY layer procedures/parameters is configured (step 1) and then one of them is activated via MAC CE (step 2), the UE starts to send PHY layer reporting to the network. The PHY layer reporting can involve CSI-RS, SRS, TCI-States, or other L1 information. Further, all these reporting can be configured for a single BWP.

In the illustrated example, once the network sends a DCI command to the UE (L1 signaling) to change the "active" BWP, the UE stops all the PHY layer procedures configured for the old BWP, as shown at step 4. The network, after sending the DCI command to UE for switching from BWPa to a BWPb, sends also a MAC CE to explicitly configure the PHY layer procedures for the new BWP.

In some embodiments, as discussed above, after the network sends "the DCI command to UE for switching from BWPa to a BWPb," as shown at step 4, or when the network sends "the PHY layer configuration for BWPb within a MAC CE", as shown at step 6, the network could start a counter where the not-received PHY layer reports are counted. Here, the PHY layer reports can involve CSI-RS, SRS, TCI-States, or other L1 information. Once the counter reaches the maximum value, the network could re-send the MAC CE to configure the PHY layer procedures for the new BWP.

Figure 4:
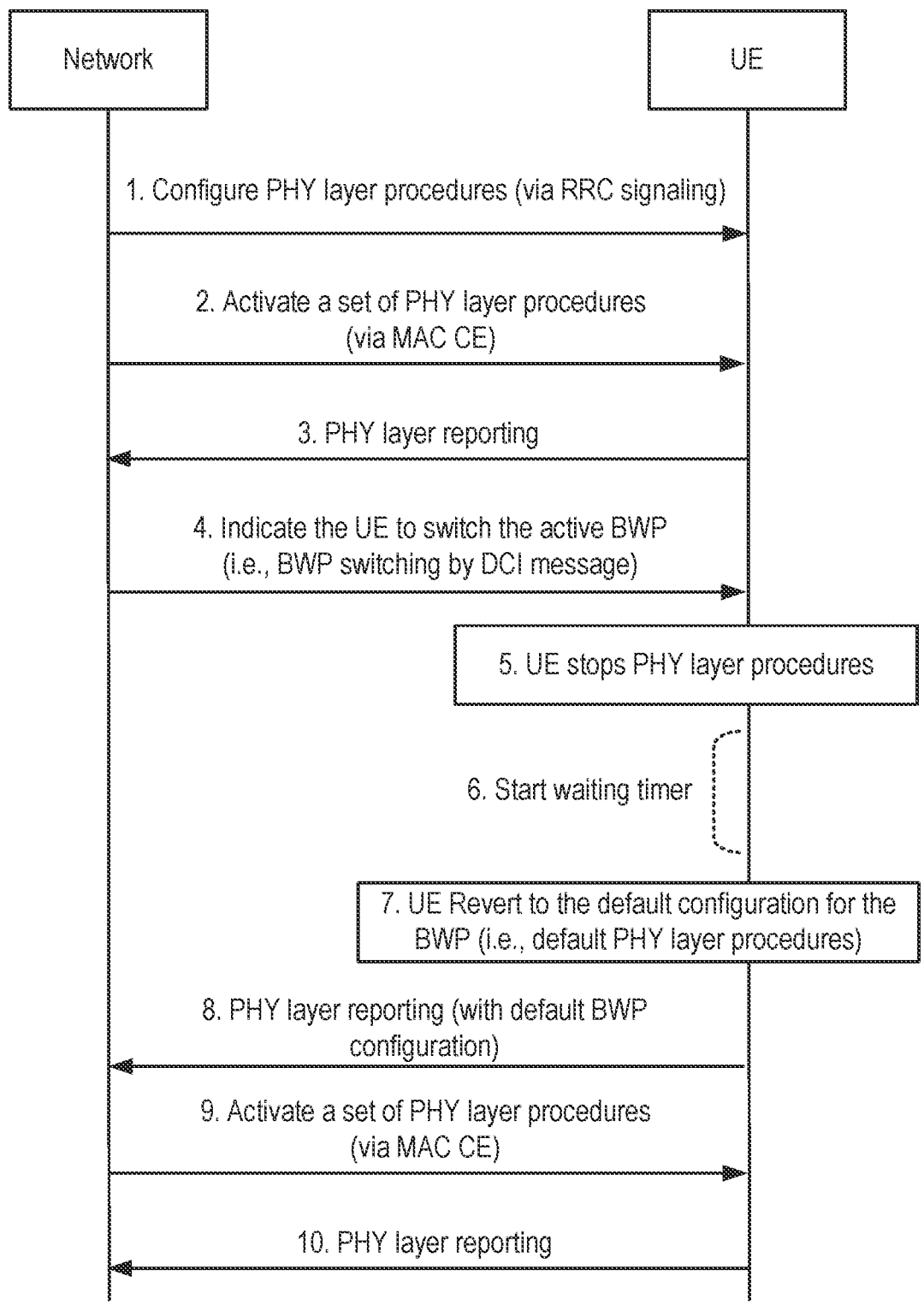
FIG. 4 illustrates an example signal flow, where upon BWP switching, the UE stops the PHY layer procedure and uses the expiration of a timer to revert to the default PHY layer configuration for the BWP, according to some embodiments.

FIG. 4 illustrates a signaling flow, where upon BWP switching, the UE stops the PHY layer procedure and starts a time. When it expires, the UE reverts to the default PHY layer configuration for the BWP. According to the example procedure shown in FIG. 4, once a set of PHY layer procedures/parameters is configured (step 1) and then one of them is activated via MAC CE (step 2), the UE starts to send PHY layer reporting to the network. The PHY layer reporting can involve CSI-RS, SRS, TCI-States, or other L1 information. Further, all this reporting can be configured for a single BWP.

In the illustrated example, once the network sends a DCI command to the UE (L1 signaling) to change the "active" BWP, the UE stops all the PHY layer procedures configured for the old BWP, as shown at step 5. In some embodiments, UE starts a waiting timer, as shown at step 6, during which a MAC CE command with the new PHY layer procedures/parameters can be received by the network. For this timer, the BWP-InactivityTimer can be used or a new timer (e.g., MacCeBWPTimer) can be configured.

In these embodiments, if the UE receives a MAC CE command with the PHY layer procedure for the new active BWP, the new reporting based on this configuration is applied. Alternatively, if no MAC CE is received and the waiting timer expires, the UE reverts autonomously to the default configuration for the BWP, e.g., as shown at step 7 of FIG. 4. Reverting to the default configuration for the BWP implies that also PHY layer procedures related to this BWP are used. Alternatively (if there is no default configuration), a re-establishment procedure may be triggered.

Figure 5:
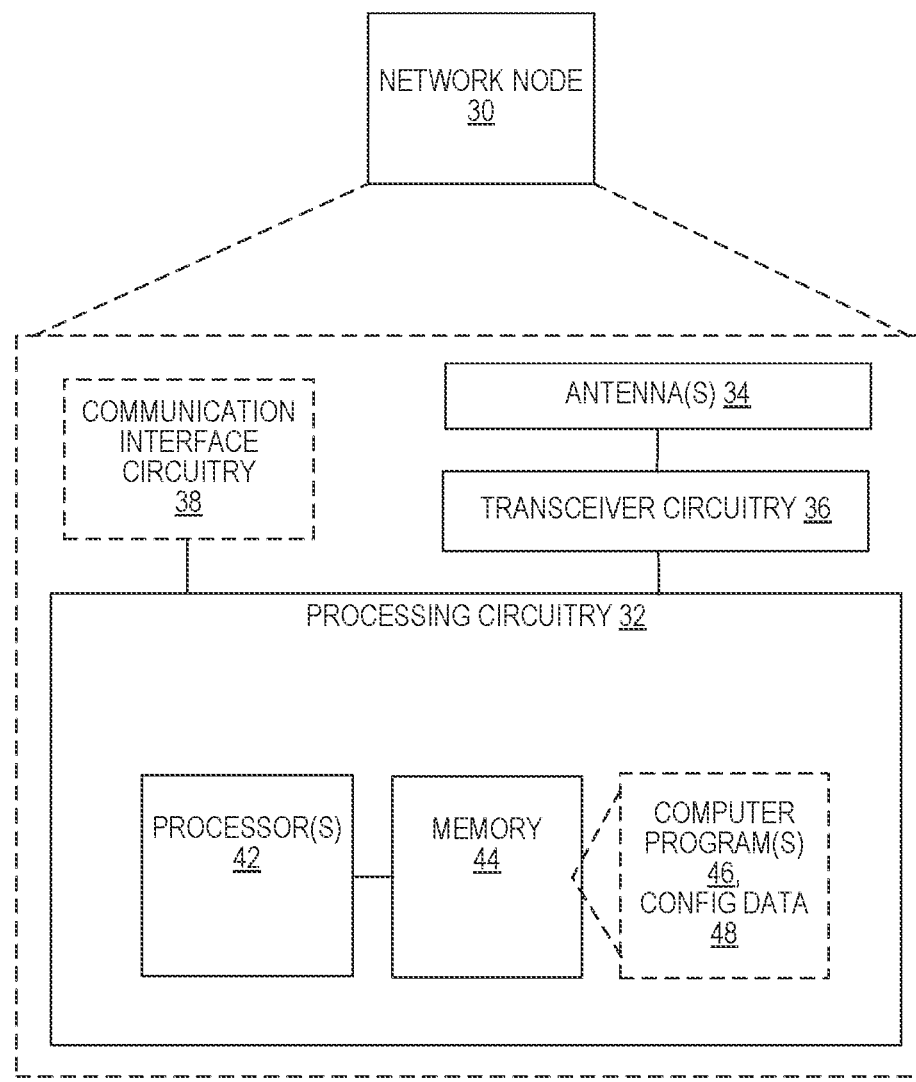
FIG. 5 illustrates is a block diagram of a network node, according to some embodiments.

FIG. 5 shows a network node 30, such as a base station, which may be configured to carry out one or more of these disclosed techniques. The base station may be an evolved Node B (eNodeB), Node B or gNB. These operations can be performed by other kinds of network nodes or relay nodes. In the non-limiting embodiments described below, the network node 30 will be described as being configured to operate as a cellular network access node in an LTE network or NR network.

Those skilled in the art will readily appreciate how each type of node may be adapted to carry out one or more of the methods and signaling processes described herein, e.g., through the modification of and/or addition of appropriate program instructions for execution by processing circuits 32.

The network node 30 facilitates communication between wireless terminals, other network access nodes and/or the core network. The network node 30 may include communication interface circuitry 38 that includes circuitry for communicating with other nodes in the core network, radio nodes, and/or other types of nodes in the network for the purposes of providing data and/or cellular communication services. The network node 30 communicates with wireless devices using antennas 34 and transceiver circuitry 36. The transceiver circuitry 36 may include transmitter circuits, receiver circuits, and associated control circuits that are collectively configured to transmit and receive signals according to a radio access technology, for the purposes of providing cellular communication services.

The network node 30 also includes one or more processing circuits 32 that are operatively associated with the transceiver circuitry 36 and, in some cases, the communication interface circuitry 38. The processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 32 may comprise fixed circuitry, or programmable circuitry that is specially configured via the execution of program instructions implementing the functionality taught herein, or may comprise some mix of fixed and programmed circuitry. The processor 42 may be multi-core, i.e., having two or more processor cores utilized for enhanced performance, reduced power consumption, and more efficient simultaneous processing of multiple tasks.

The processing circuitry 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, the memory 44 comprises any one or more of SRAM, DRAM, EEPROM, and FLASH memory, which may be in the processing circuitry 32 and/or separate from the processing circuitry 32. The memory 44 may also store any configuration data 48 used by the network access node 30. The processing circuitry 32 may be configured, e.g., through the use of appropriate program code stored in memory 44, to carry out one or more of the methods and/or signaling processes detailed hereinafter.

The processing circuitry 32 of the network node 30 is configured, according to some embodiments, to serve a wireless device configured to selectively operate in one of two or more previously configured BWPs, where each BWP being a different subset of an available bandwidth for uplink and/or downlink operation. The processing circuitry 32 of the network node 30 is also configured to send, to the wireless device, an indication to switch from use of a first BWP to a second BWP and count a number of physical layer reports expected from the wireless device during use of the second BWP but not received. The processing circuitry 32 is configured to, responsive to the number reaching a predetermined limit, send one or more MAC CEs to configure physical layer reporting for the second BWP.

Figure 6:
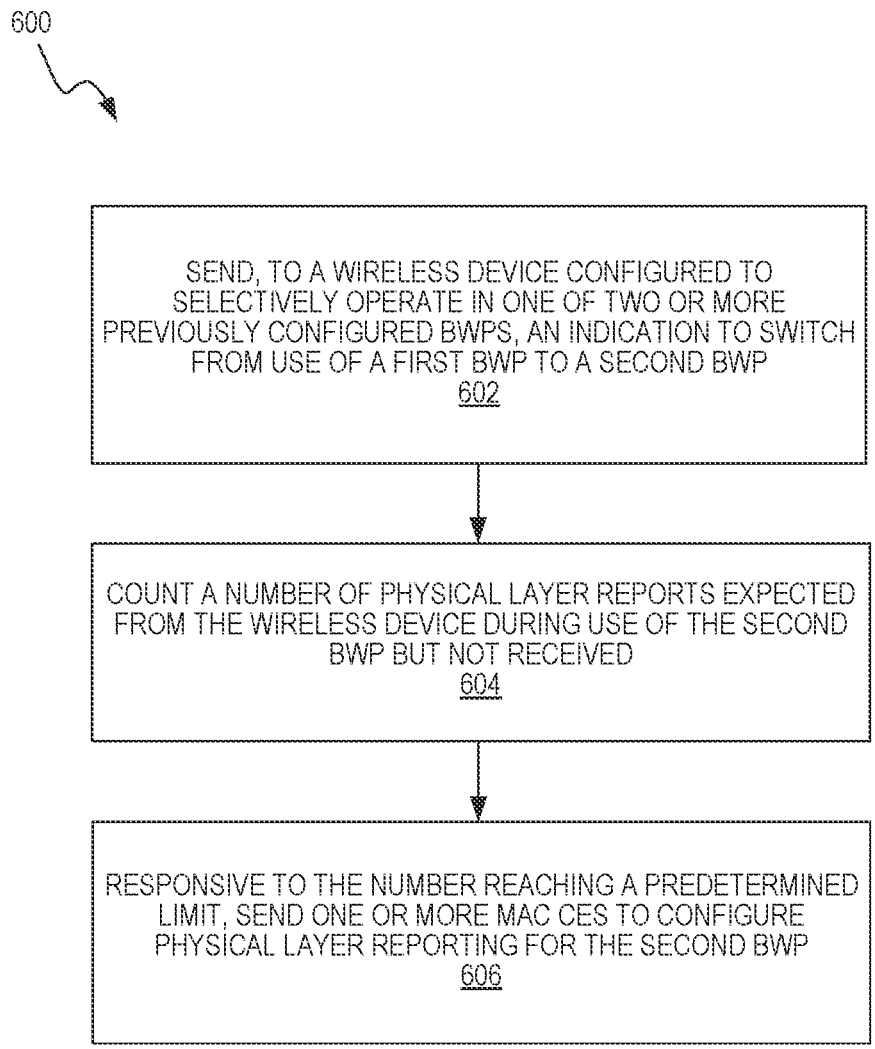
FIG. 6 illustrates a flow diagram of a method in the network node, according to some embodiments.

The processing circuitry 32 of the network node 30 may also be configured to perform a corresponding method 600, as shown in FIG. 6. The method 600 includes sending, to the wireless device, an indication to switch from use of a first BWP to a second BWP (block 602) and counting a number of physical layer reports expected from the wireless device during use of the second BWP but not received (block 604). The method 600 also includes, responsive to the number reaching a predetermined limit, sending one or more MAC CEs to configure physical layer reporting for the second BWP (block 606).

The method 600 may further include sending one or more first MAC CEs to configure physical layer reporting for the second BWP, subsequent to sending the indication to switch from use of the first BWP to the second BWP, wherein said counting begins upon sending the one or more first MAC CEs.

Figure 7:
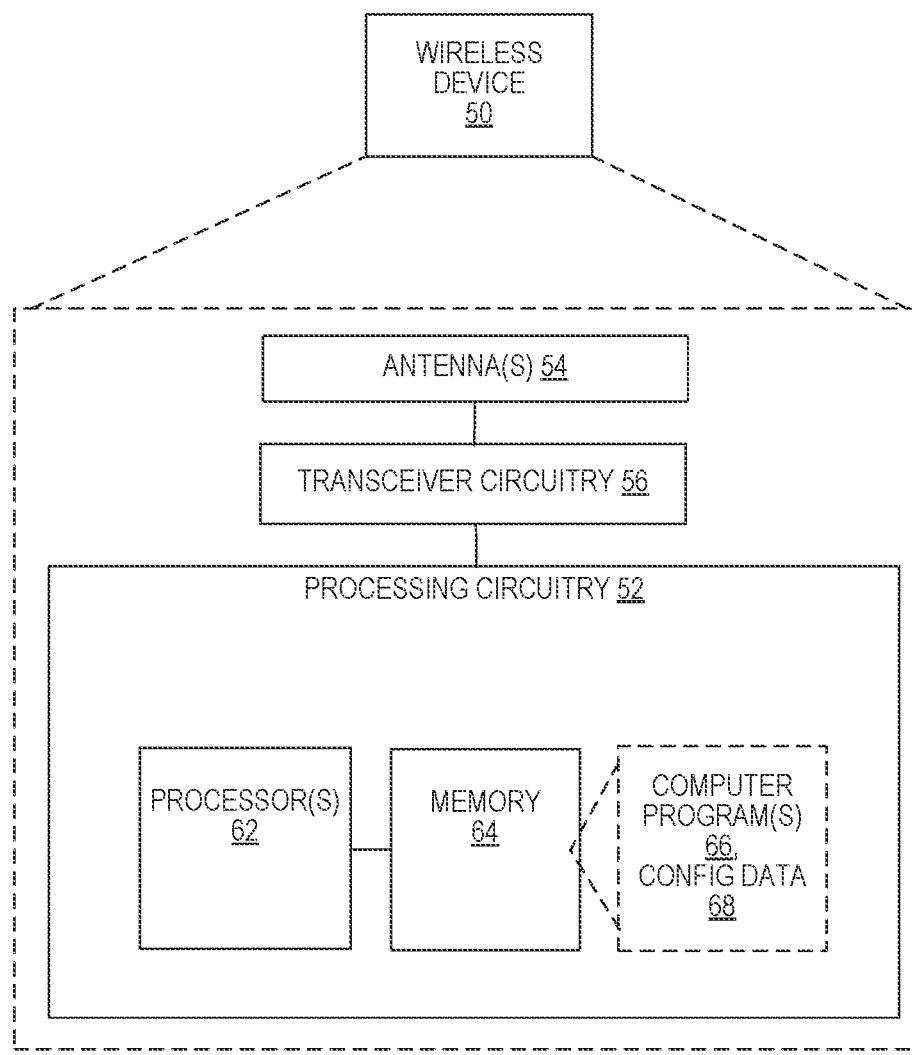
FIG. 7 illustrates a block diagram of a wireless device, according to some embodiments.
Figure 8:
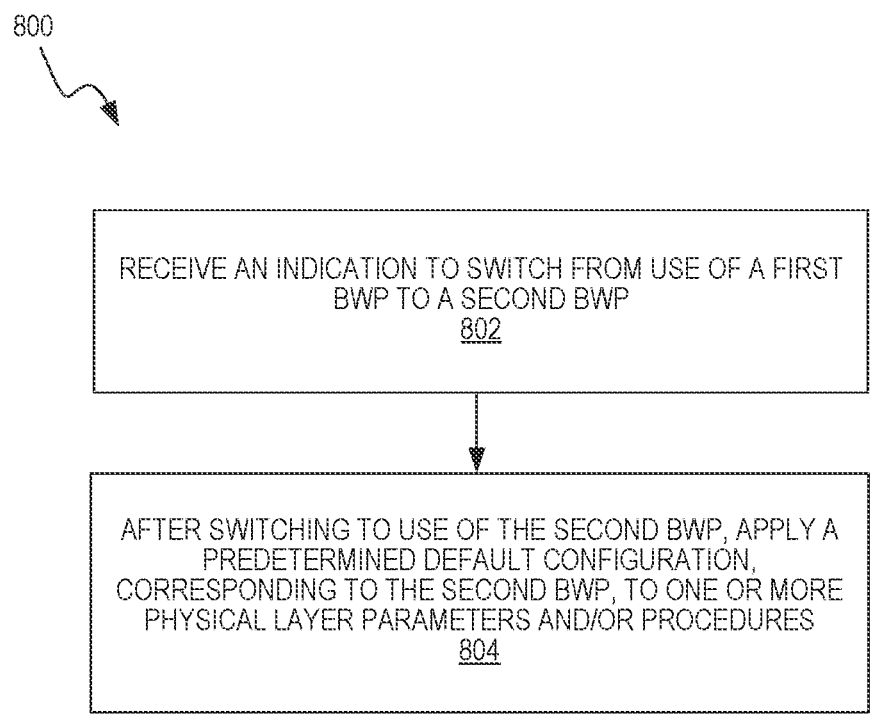
FIG. 8 illustrates a flow diagram of a method in the wireless device, according to some embodiments.
Figure 9:
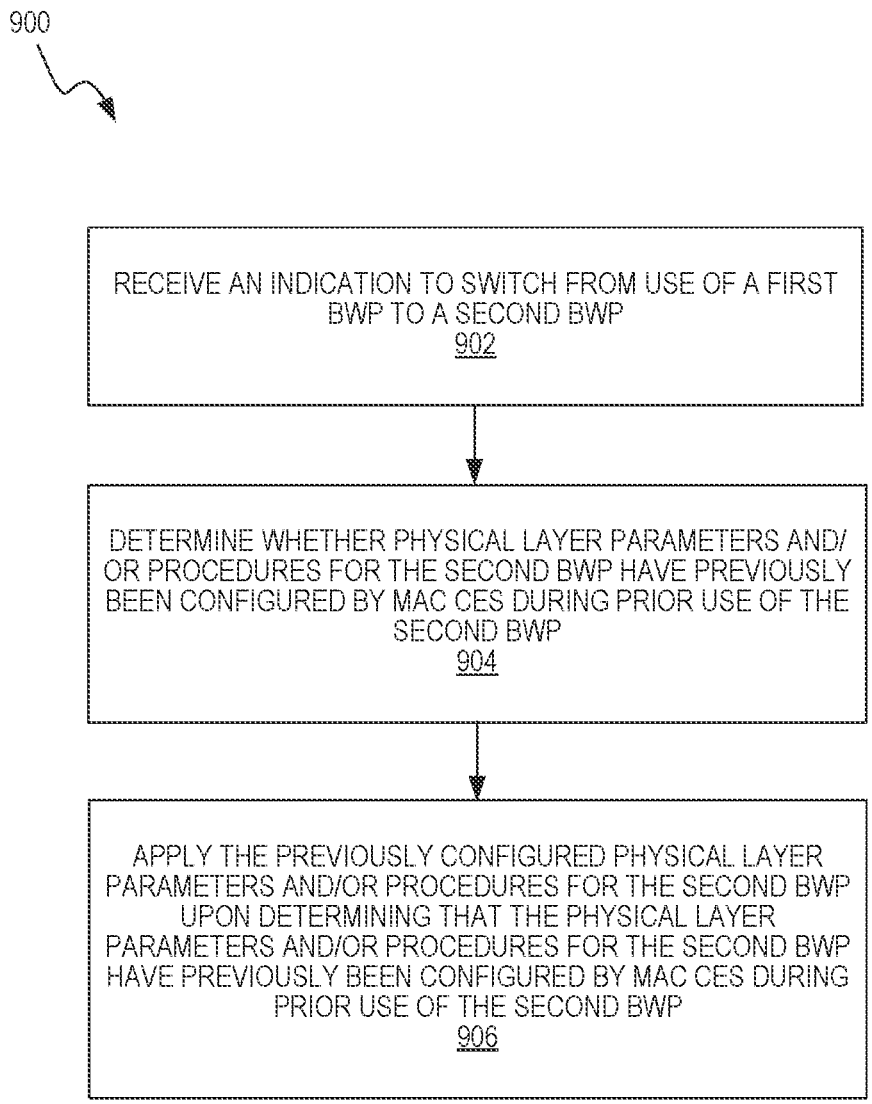
FIG. 9 illustrates a flow diagram of another method in the wireless device, according to some embodiments.
Figure 10:
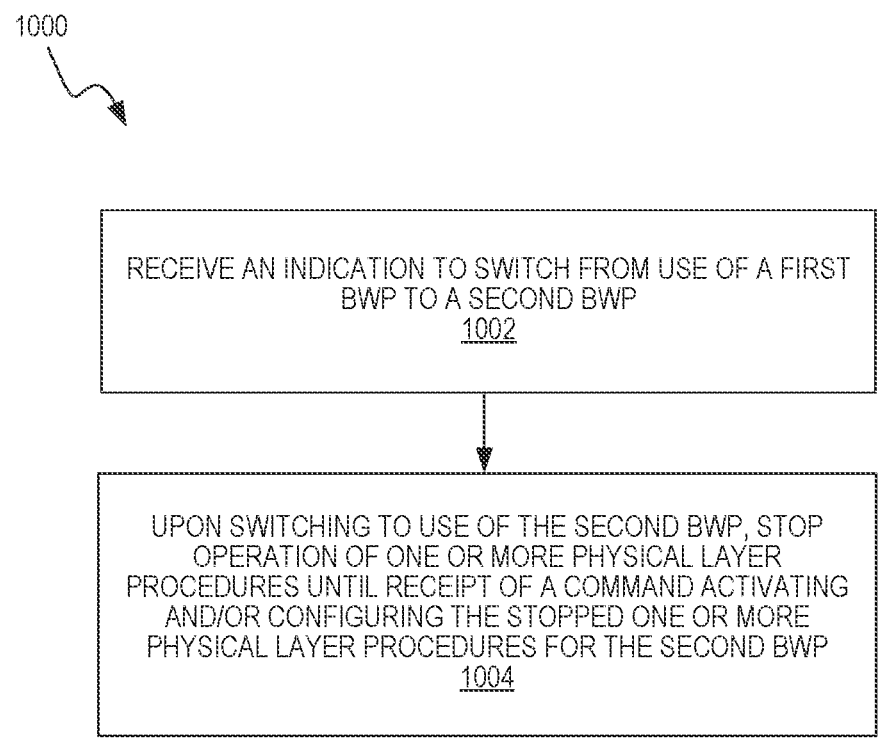
FIG. 10 illustrates a flow diagram of another method in the wireless device, according to some embodiments.
Figure 11:
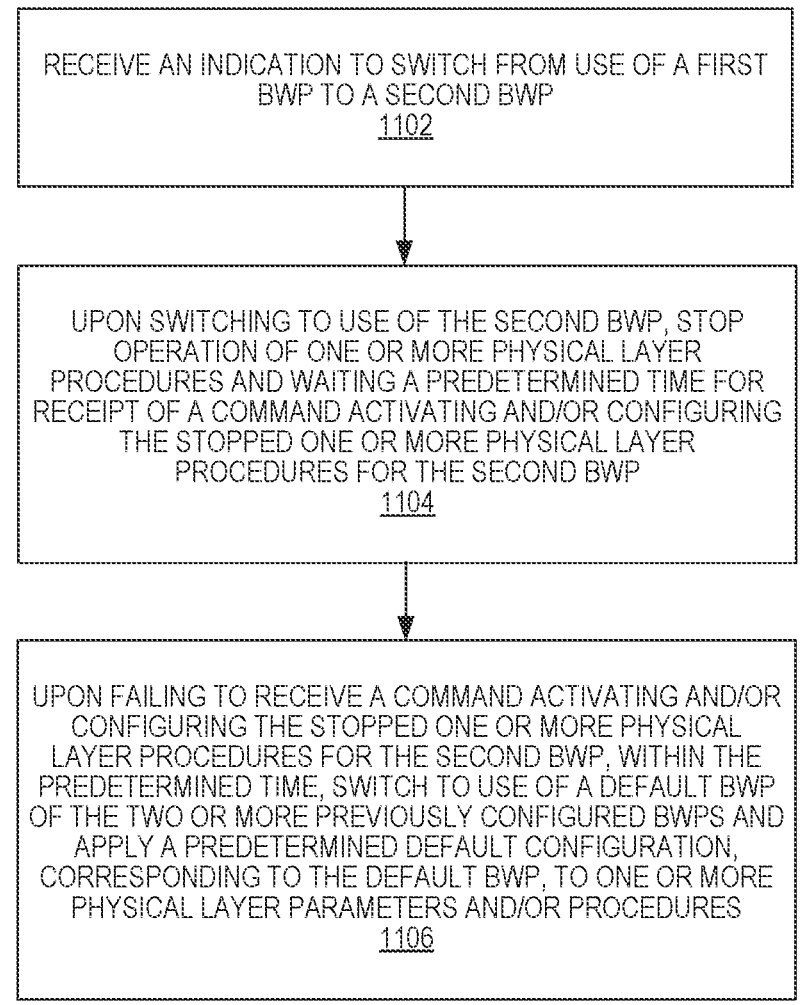
FIG. 11 illustrates a flow diagram of another method in the wireless device, according to some embodiments.

FIG. 7 illustrates a diagram of a wireless device, shown as wireless device 50, according to some embodiments. The wireless device 50 may be considered to represent any wireless terminals that may operate in a network, such as a UE in a cellular network. Other examples may include a communication device, target device, device to device (D2D) UE, machine type UE or UE capable of machine to machine communication (M2M), a sensor equipped with UE, PDA (personal digital assistant), Tablet, mobile terminal, smart phone, laptop embedded equipped (LEE), laptop mounted equipment (LME), USB dongles, Customer Premises Equipment (CPE), etc.

The wireless device 50 is configured to communicate with a radio network node or base station in a wide-area cellular network via antennas 54 and transceiver circuitry 56. The transceiver circuitry 56 may include transmitter circuits, receiver circuits, and associated control circuits that are collectively configured to transmit and receive signals according to a radio access technology, for the purposes of using cellular communication services. This radio access technologies are NR and LTE for the purposes of this discussion.

The wireless device 50 also includes one or more processing circuits 52 that are operatively associated with the radio transceiver circuitry 56. The processing circuitry 52 comprises one or more digital processing circuits, e.g., one or more microprocessors, microcontrollers, DSPs, FPGAs, CPLDs, ASICs, or any mix thereof. More generally, the processing circuitry 52 may comprise fixed circuitry, or programmable circuitry that is specially adapted via the execution of program instructions implementing the functionality taught herein, or may comprise some mix of fixed and programmed circuitry. The processing circuitry 52 may be multi-core.

The processing circuitry 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuitry 52 and/or separate from processing circuitry 52. The memory 64 may also store any configuration data 68 used by the wireless device 50. The processing circuitry 52 may be configured, e.g., through the use of appropriate program code stored in memory 64, to carry out one or more of the methods and/or signaling processes detailed hereinafter.

The processing circuitry 52 of the wireless device 50 is configured, according to some embodiments, to selectively operate in one of two or more previously configured BWPs, where each BWP being a different subset of an available bandwidth for uplink and/or downlink operation. The processing circuitry 52 is configured to receive an indication to switch from use of a first BWP to a second BWP, and after switching to use of the second BWP, apply a predetermined default configuration, corresponding to the second BWP, to one or more physical layer parameters and/or procedures.

In some embodiments, the processing circuitry 52 is configured to receive an indication to switch from use of a first BWP to a second BWP and determine whether physical layer parameters and/or procedures for the second BWP have previously been configured by MAC CEs during prior use of the second BWP. The processing circuitry 52 is also configured to apply the previously configured physical layer parameters and/or procedures for the second BWP upon determining that the physical layer parameters and/or procedures for the second BWP have previously been configured by MAC CEs during prior use of the second BWP.

In other embodiments, the processing circuitry 52 is configured to receive an indication to switch from use of a first BWP to a second BWP and upon switching to use of the second BWP, stop operation of one or more physical layer procedures until receipt of a command activating and/or configuring the stopped one or more physical layer procedures for the second BWP.

In some embodiments, the processing circuitry 52 is configured to receive an indication to switch from use of a first BWP to a second BWP, and upon switching to use of the second BWP, stop operation of one or more physical layer procedures and waiting a predetermined time for receipt of a command activating and/or configuring the stopped one or more physical layer procedures for the second BWP. The processing circuitry 52 is configured to, upon failing to receive a command activating and/or configuring the stopped one or more physical layer procedures for the second BWP, within the predetermined time, switch to use of a default BWP of the two or more previously configured BWPs and apply a predetermined default configuration, corresponding to the default BWP, to one or more physical layer parameters and/or procedures.

According to some embodiments, the processing circuitry 52 is configured to perform corresponding methods, such as methods 800-1100 for the wireless device 50 shown in FIGS. 8-11. For example, method 800 includes receiving an indication to switch from use of a first BWP to a second BWP (block 802), and after switching to use of the second BWP, applying a predetermined default configuration, corresponding to the second BWP, to one or more physical layer parameters and/or procedures (block 804).

The predetermined default configuration may be one of a plurality of predetermined default configurations, each of the predetermined default configurations uniquely corresponding to a respective one of the previously configured BWPs. The predetermined default configuration may be a common default configuration corresponding to two or more of the previously configured BWPs, including the second BWP. The predetermined default configuration may be applied immediately upon switching to use of the second BWP.

In some embodiments, the method 800 further includes, upon switching to use of the second BWP, stopping operation of one or more physical layer procedures. The method 800 also includes waiting a predetermined time for receipt of a command activating and/or configuring the stopped one or more physical layer procedures for the second BWP. The applying of the predetermined default configuration may be performed upon failing to receive a command activating and/or configuring the stopped one or more physical layer procedures for the second BWP, within the predetermined time.

The method 800 may also include, upon switching to use of the second BWP, determining whether physical layer parameters and/or procedures for the second BWP have previously been configured by MAC CEs during prior use of the second BWP. The applying of the predetermined default configuration may be performed upon determining that physical layer parameters and/or procedures for the second BWP have not previously been configured by MAC CEs during prior use of the second BWP.

The method 800 may further include, upon switching to use of the second BWP, determining whether physical layer parameters and/or procedures for the second BWP have previously been configured by MAC CEs during prior use of the second BWP and within a predetermined interval prior to said switching. The applying of the predetermined default configuration may be performed upon determining that physical layer parameters and/or procedures for the second BWP have not previously been configured by MAC CEs during prior use of the second BWP and within the predetermined interval.

The method 800 may include, upon switching to use of the second BWP, determining whether physical layer parameters and/or procedures for the second BWP have previously been configured by MAC CEs during prior use of the second BWP that occurred without either a change in state from active to idle or a handover. The applying of the predetermined default configuration may be performed upon determining that physical layer parameters and/or procedures for the second BWP have not previously been configured by MAC CEs during prior use of the second BWP that occurred without either a change in state from active to idle or a handover.

The method 800 may include, subsequently to applying the predetermined default configuration, receiving a command activating and/or configuring one or more physical layer procedures for the second BWP, and performing the one or more physical layer procedures according to the received command.

According to some embodiments, the method 900 includes receiving an indication to switch from use of a first BWP to a second BWP (block 902) and determining whether physical layer parameters and/or procedures for the second BWP have previously been configured by medium access control MAC CEs during prior use of the second BWP (block 904). The method 900 includes applying the previously configured physical layer parameters and/or procedures for the second BWP upon determining that the physical layer parameters and/or procedures for the second BWP have previously been configured by MAC CEs during prior use of the second BWP (block 906).

The applying of the previously configured physical layer parameters and/or procedures for the second BWP may be further conditioned upon determining that these previously configured physical layer parameters and/or procedures for the second BWP were configured within a predetermined time interval prior to switching from the first BWP to the second BWP.

The applying the previously configured physical layer parameters and/or procedures for the second BWP may be further conditioned upon determining that no change from active state to idle state and/or no handover has occurred since the previously configured physical layer parameters and/or procedures for the second BWP were configured.

According to some embodiments, the method 1000 may include receiving an indication to switch from use of a first BWP to a second BWP (block 1002) and, upon switching to use of the second BWP, stopping operation of one or more physical layer procedures until receipt of a command activating and/or configuring the stopped one or more physical layer procedures for the second BWP (block 1004).

According to some embodiments, the method 1100 includes receiving an indication to switch from use of a first BWP to a second BWP (block 1102), and upon switching to use of the second BWP, stopping operation of one or more physical layer procedures and waiting a predetermined time for receipt of a command activating and/or configuring the stopped one or more physical layer procedures for the second BWP (block 1104). The method 1100 also includes, upon failing to receive a command activating and/or configuring the stopped one or more physical layer procedures for the second BWP, within the predetermined time, switching to use of a default BWP of the two or more previously configured BWPs and applying a predetermined default configuration, corresponding to the default BWP, to one or more physical layer parameters and/or procedures (block 1106).

The physical layer parameters and/or procedures may include CSI reporting, interference measurement reporting and/or SRS configuration parameters.

Figure 12:
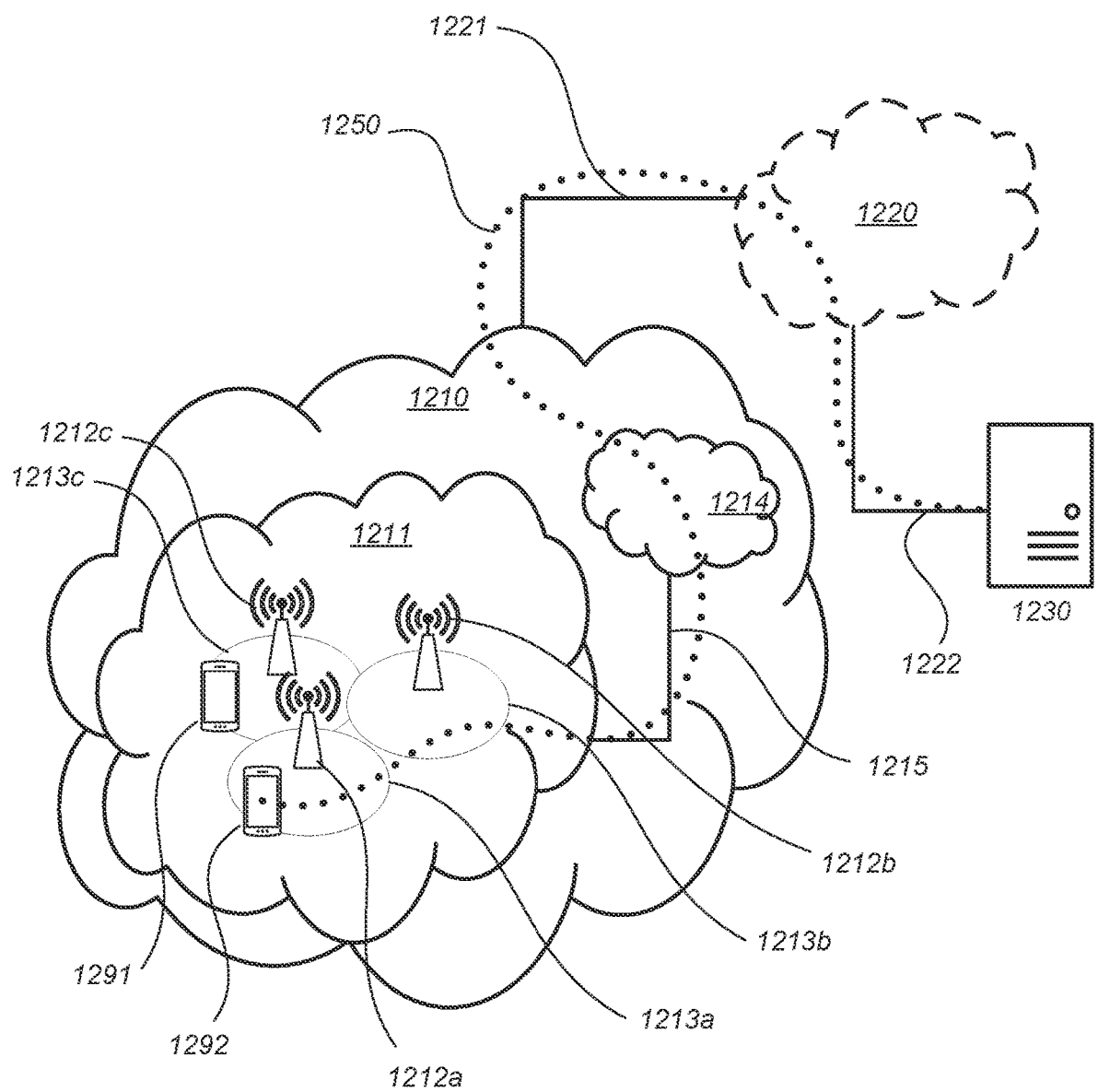
FIG. 12 schematically illustrates a telecommunication network connected via an intermediate network to a host computer, according to some embodiments.

FIG. 12, according to some embodiments, illustrates a communication system that includes a telecommunication network 1210, such as a 3GPP-type cellular network, which comprises an access network 1211, such as a radio access network, and a core network 1214. The access network 1211 comprises a plurality of base stations 812a, 1212b, 1212c, such as NBs, eNBs, gNBs or other types of wireless access points, each defining a corresponding coverage area 1213a, 1213b, 1213c. Each base station 1212a, 1212b, 1212c is connectable to the core network 1214 over a wired or wireless connection 1215. A first user equipment (UE) 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

The telecommunication network 1210 is itself connected to a host computer 1230, which may be embodied in the hardware and/or software of a standalone server, a cloud-implemented server, a distributed server or as processing resources in a server farm. The host computer 1230 may be under the ownership or control of a service provider, or may be operated by the service provider or on behalf of the service provider. The connections 1221, 1222 between the telecommunication network 1210 and the host computer 1230 may extend directly from the core network 1214 to the host computer 1230 or may go via an optional intermediate network 1220. The intermediate network 1220 may be one of, or a combination of more than one of, a public, private or hosted network; the intermediate network 1220, if any, may be a backbone network or the Internet; in particular, the intermediate network 1220 may comprise two or more sub-networks (not shown).

The communication system of FIG. 12 as a whole enables connectivity between one of the connected UEs 1291, 1292 and the host computer 1230. The connectivity may be described as an over-the-top (OTT) connection 1250. The host computer 1230 and the connected UEs 1291, 1292 are configured to communicate data and/or signaling via the OTT connection 1250, using the access network 1211, the core network 1214, any intermediate network 1220 and possible further infrastructure (not shown) as intermediaries. The OTT connection 1250 may be transparent in the sense that the participating communication devices through which the OTT connection 1250 passes are unaware of routing of uplink and downlink communications. For example, a base station 1212 may not or need not be informed about the past routing of an incoming downlink communication with data originating from a host computer 1230 to be forwarded (e.g., handed over) to a connected UE 1291. Similarly, the base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises processing circuitry 1318, which may have storage and/or processing capabilities. In particular, the processing circuitry 1318 may comprise one or more programmable processors, application-specific integrated circuits, field programmable gate arrays or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as a UE 1330 connecting via an OTT connection 1350 terminating at the UE 1330 and the host computer 1310. In providing the service to the remote user, the host application 1312 may provide user data which is transmitted using the OTT connection 1350.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with a UE 1330 located in a coverage area (not shown in FIG. 13) served by the base station 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the base station 1320 further includes processing circuitry 1328, which may comprise one or more programmable processors, application-specific integrated circuits, field programmable gate arrays or combinations of these (not shown) adapted to execute instructions. The base station 1320 further has software 1321 stored internally or accessible via an external connection.

The communication system 1300 further includes the UE 1330 already referred to. Its hardware 1335 may include a radio interface 1337 configured to set up and maintain a wireless connection 1370 with a base station serving a coverage area in which the UE 1330 is currently located. The hardware 1335 of the UE 1330 further includes processing circuitry 1338, which may comprise one or more programmable processors, application-specific integrated circuits, field programmable gate arrays or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, an executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

Figure 13:
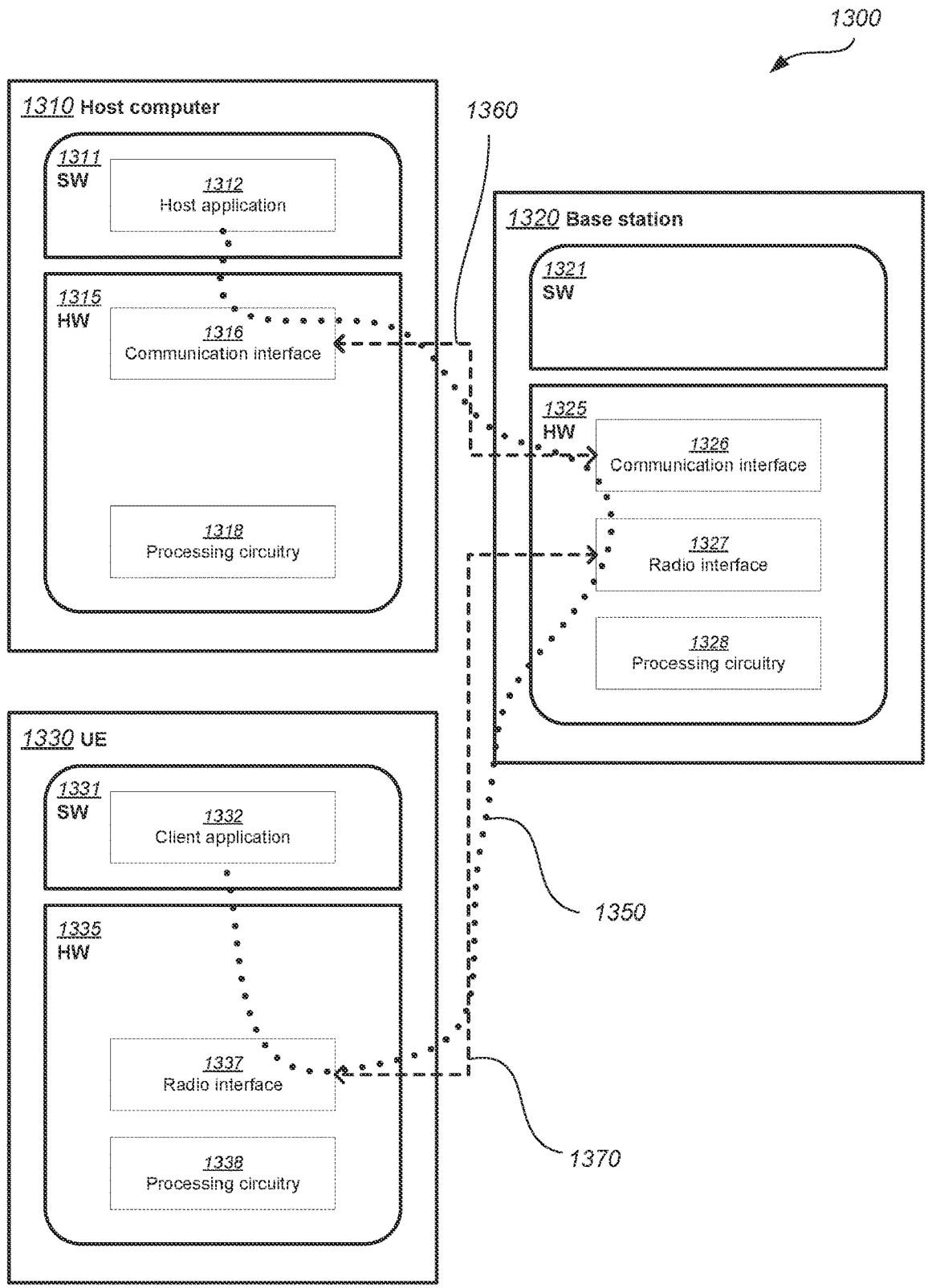
FIG. 13 is a generalized block diagram of a host computer communicating via a base station with a user equipment over a partially wireless connection, according to some embodiments.

It is noted that the host computer 1310, base station 1320 and UE 1330 illustrated in FIG. 13 may be identical to the host computer 1230, one of the base stations 1212a, 1212b, 1212c and one of the UEs 1291, 1292 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the use equipment 1330 via the base station 1320, without explicit reference to any intermediary devices and the precise routing of messages via these devices. Network infrastructure may determine the routing, which it may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

The wireless connection 1370 between the UE 1330 and the base station 1320 is in accordance with the teachings of the embodiments described throughout this disclosure, such as provided by nodes such as wireless device 50 and network node 30, along with the corresponding methods 600 and 800-1100. The misalignment of the active BWP and associated physical layer configuration results in suboptimal performance and possible erroneous behavior. The various embodiments described herein avoids the misalignment and keeps the NR performance in the expected level. This improves the data rate, capacity, latency and/or power consumption for the network and UE 1330 using the OTT connection 1350 and thereby provide benefits such as reduced user waiting time, more capacity, better responsiveness, and better device battery time.

A measurement procedure may be provided for the purpose of monitoring data rate, latency and other factors on which the one or more embodiments improve. There may further be an optional network functionality for reconfiguring the OTT connection 1350 between the host computer 1310 and UE 1330, in response to variations in the measurement results. The measurement procedure and/or the network functionality for reconfiguring the OTT connection 1350 may be implemented in the software 1311 of the host computer 1310 or in the software 1331 of the UE 1330, or both. In embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of the OTT connection 1350 may include message format, retransmission settings, preferred routing etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer's 1310 measurements of throughput, propagation times, latency and the like. The measurements may be implemented in that the software 1311, 1331 causes messages to be transmitted, in particular empty or 'dummy' messages, using the OTT connection 1350 while it monitors propagation times, errors etc.

Figure 14:
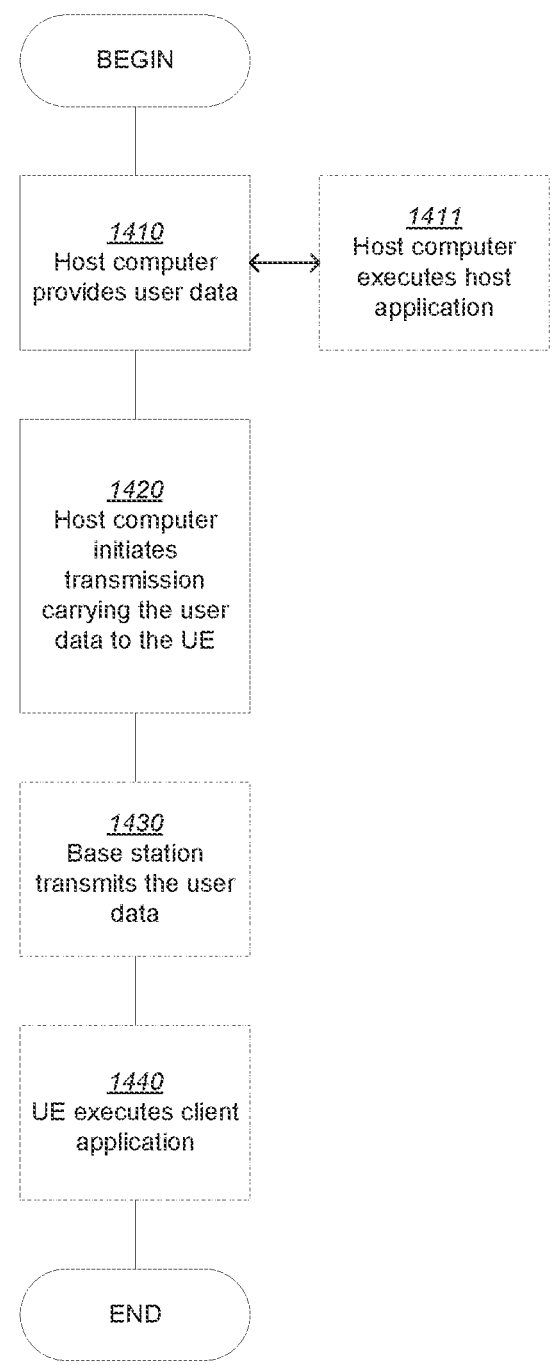
FIGS. 14 to 17 are flowcharts illustrating example methods implemented in a communication system including a host computer, a base station and a user equipment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In a first step 1410 of the method, the host computer provides user data. In an optional substep 1411 of the first step 1410, the host computer provides the user data by executing a host application. In a second step 1420, the host computer initiates a transmission carrying the user data to the UE. In an optional third step 1430, the base station transmits to the UE the user data which was carried in the transmission that the host computer initiated, in accordance with the teachings of the embodiments described throughout this disclosure. In an optional fourth step 1440, the UE executes a client application associated with the host application executed by the host computer.

Figure 15:
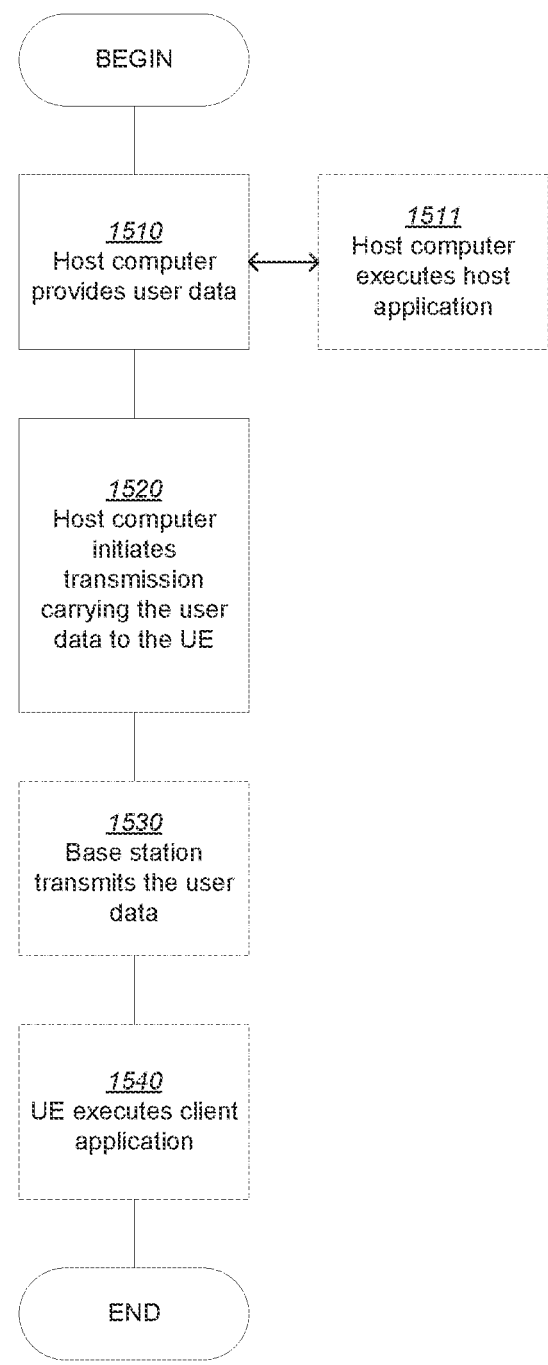

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In a first step 1510 of the method, the host computer provides user data. In an optional substep (not shown) the host computer provides the user data by executing a host application. In a second step 1520, the host computer initiates a transmission carrying the user data to the UE. The transmission may pass via the base station, in accordance with the teachings of the embodiments described throughout this disclosure. In an optional third step 1530, the UE receives the user data carried in the transmission.

Figure 16:
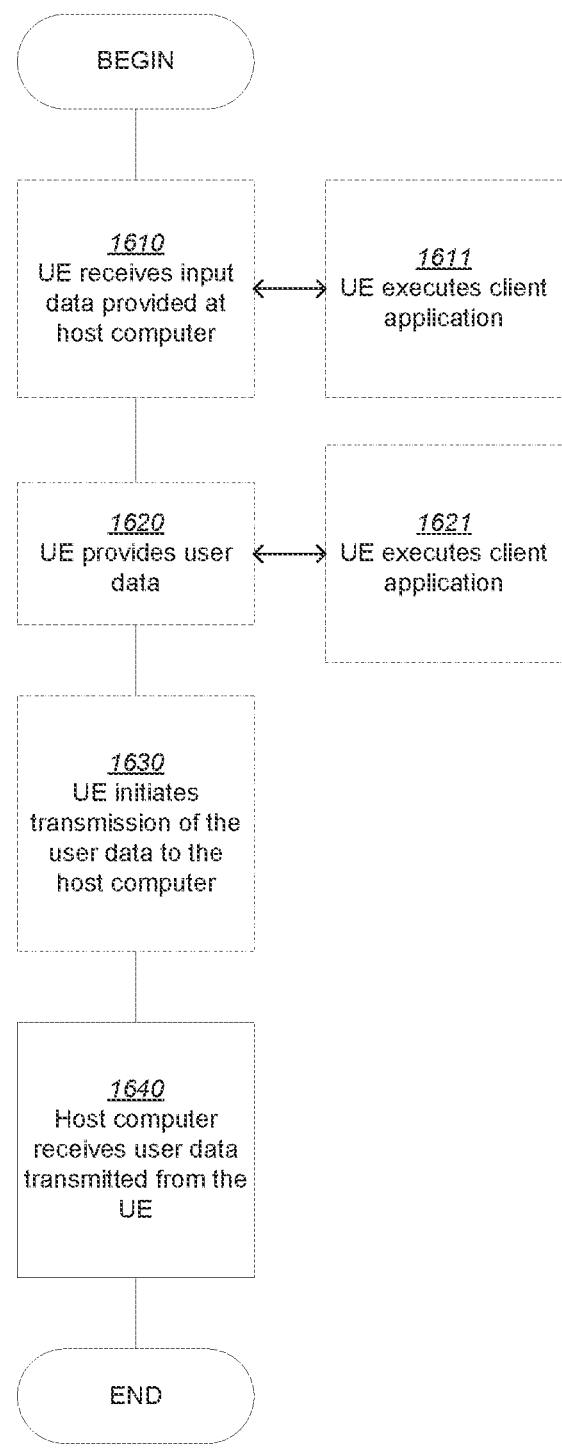

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In an optional first step 1610 of the method, the UE receives input data provided by the host computer. Additionally, or alternatively, in an optional second step 1620, the UE provides user data. In an optional substep 1621 of the second step 1620, the UE provides the user data by executing a client application. In a further optional substep 1611 of the first step 1610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1630, transmission of the user data to the host computer. In a fourth step 1640 of the method, the host computer receives the user data transmitted from the UE, in accordance with the teachings of the embodiments described throughout this disclosure.

Figure 17:
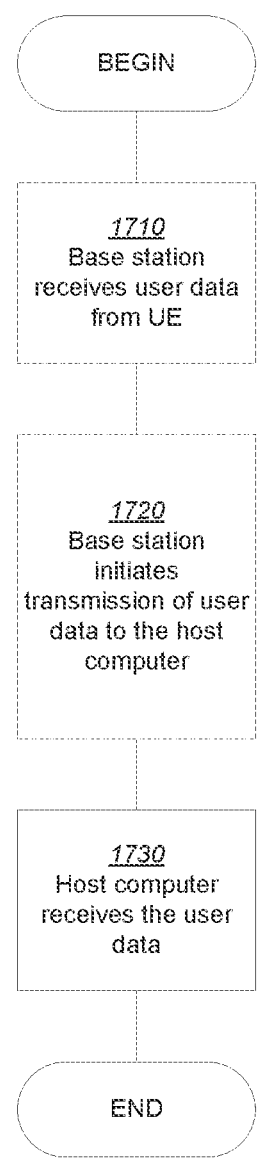

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In an optional first step 1710 of the method, in accordance with the teachings of the embodiments described throughout this disclosure, the base station receives user data from the UE. In an optional second step 1720, the base station initiates transmission of the received user data to the host computer. In a third step 1730, the host computer receives the user data carried in the transmission initiated by the base station.

Based on the communication system shown in FIGS. 12-13, further embodiments will be described. According to some embodiments, a communication system including a host computer comprises processing circuitry configured to provide user data and a communication interface configured to forward the user data to a cellular network for transmission to a UE configured to selectively operate in one of two or more previously configured BWPs, each BWP being a different subset of an available bandwidth for uplink and/or downlink operation. The cellular network comprises a base station configured to serve the UE and configured to send, to the UE, an indication to switch from use of a first BWP to a second BWP and count a number of physical layer reports expected from the UE during use of the second BWP but not received. Responsive to the number reaching a predetermined limit, the base station sends one or more MAC CEs to configure physical layer reporting for the second BWP. The communication system may include the base station and/or the UE configured to communicate with the base station. The processing circuitry of the host computer may be configured to execute a host application, thereby providing the user data, and the UE may comprise processing circuitry configured to execute a client application associated with the host application.

According to some embodiments, a method implemented in a communication system including a host computer, a base station and a UE configured to selectively operate in one of two or more previously configured BWPs, each BWP being a different subset of an available bandwidth for uplink and/or downlink operation, comprises, at the host computer, providing user data and, at the host computer, initiating a transmission carrying the user data to the UE via a cellular network comprising the base station, configured to serve the UE. The method at the base station comprises sending, to the UE, an indication to switch from use of a first BWP to a second BWP, counting a number of physical layer reports expected from the UE during use of the second BWP but not received and, responsive to the number reaching a predetermined limit, sending one or more MAC control elements CEs to configure physical layer reporting for the second BWP. The method may further comprise, at the base station, transmitting the user data. The user data may be provided at the host computer by executing a host application, the method further comprising, at the UE, executing a client application associated with the host application.

According to some embodiments, a communication system including a host computer comprises processing circuitry configured to provide user data and a communication interface configured to forward user data to a cellular network for transmission to a UE configured to selectively operate in one of two or more previously configured BWPs, each BWP being a different subset of an available bandwidth for uplink and/or downlink operation, where the UE comprises a radio interface and processing circuitry configured to receive an indication to switch from use of a first BWP to a second BWP and, after switching to use of the second BWP, apply a predetermined default configuration, corresponding to the second BWP, to one or more physical layer parameters and/or procedures.

According to some embodiments, a communication system including a host computer comprises processing circuitry configured to provide user data and a communication interface configured to forward user data to a cellular network for transmission to a UE configured to selectively operate in one of two or more previously configured BWPs, each BWP being a different subset of an available bandwidth for uplink and/or downlink operation, where the UE comprises a radio interface and processing circuitry configured to receive an indication to switch from use of a first BWP to a second BWP, determine whether physical layer parameters and/or procedures for the second BWP have previously been configured by MAC CEs during prior use of the second BWP and apply the previously configured physical layer parameters and/or procedures for the second BWP upon determining that the physical layer parameters and/or procedures for the second BWP have previously been configured by MAC CEs during prior use of the second BWP.

According to some embodiments, a communication system including a host computer comprises processing circuitry configured to provide user data and a communication interface configured to forward user data to a cellular network for transmission to a UE configured to selectively operate in one of two or more previously configured BWPs, each BWP being a different subset of an available bandwidth for uplink and/or downlink operation, where the UE comprises a radio interface and processing circuitry configured to receive an indication to switch from use of a first BWP to a second BWP and, upon switching to use of the second BWP, stop operation of one or more physical layer procedures until receipt of a command activating and/or configure the stopped one or more physical layer procedures for the second BWP.

According to some embodiments, a communication system including a host computer comprises processing circuitry configured to provide user data and a communication interface configured to forward user data to a cellular network for transmission to a UE configured to selectively operate in one of two or more previously configured BWPs, each BWP being a different subset of an available bandwidth for uplink and/or downlink operation, where the UE comprises a radio interface and processing circuitry configured to receive an indication to switch from use of a first BWP to a second BWP and, upon switching to use of the second BWP, stop operation of one or more physical layer procedures and waiting a predetermined time for receipt of a command activating and/or configuring the stopped one or more physical layer procedures for the second BWP. The processing circuitry is also configured to, upon failing to receive a command activating and/or configuring the stopped one or more physical layer procedures for the second BWP, within the predetermined time, switch to use of a default BWP of the two or more previously configured BWPs and apply a predetermined default configuration, corresponding to the default BWP, to one or more physical layer parameters and/or procedures. The communication system may further include the UE, and the cellular network may further include a base station configured to communicate with the UE. The processing circuitry of the host computer may be configured to execute a host application, thereby providing the user data, and the UE's processing circuitry may be configured to execute a client application associated with the host application.

According to some embodiments, a method implemented in a communication system including a host computer, a base station and a UE configured to selectively operate in one of two or more previously configured BWPs, each BWP being a different subset of an available bandwidth for uplink and/or downlink operation. The method comprises, at the host computer, providing user data and, at the host computer, initiating a transmission carrying the user data to the UE via a cellular network comprising the base station. The method comprises, at the UE, receiving an indication to switch from use of a first BWP to a second BWP and, after switching to use of the second BWP, applying a predetermined default configuration, corresponding to the second BWP, to one or more physical layer parameters and/or procedures.

According to some embodiments, a method implemented in a communication system including a host computer, a base station and a UE configured to selectively operate in one of two or more previously configured BWPs, each BWP being a different subset of an available bandwidth for uplink and/or downlink operation. The method comprises, at the host computer, providing user data and, at the host computer, initiating a transmission carrying the user data to the UE via a cellular network comprising the base station, where the method comprises, at the UE, receiving an indication to switch from use of a first BWP to a second BWP and determining whether physical layer parameters and/or procedures for the second BWP have previously been configured by MAC CEs during prior use of the second BWP. The method at the UE also comprises applying the previously configured physical layer parameters and/or procedures for the second BWP upon determining that the physical layer parameters and/or procedures for the second BWP have previously been configured by MAC CEs during prior use of the second BWP.

According to some embodiments, a method implemented in a communication system including a host computer, a base station and a UE configured to selectively operate in one of two or more previously configured BWPs, each BWP being a different subset of an available bandwidth for uplink and/or downlink operation. The method comprises, at the host computer, providing user data and, at the host computer, initiating a transmission carrying the user data to the UE via a cellular network comprising the base station, where the method comprises, at the UE, receiving an indication to switch from use of a first BWP to a second BWP and, upon switching to use of the second BWP, stopping operation of one or more physical layer procedures until receipt of a command activating and/or configuring the stopped one or more physical layer procedures for the second BWP.

According to some embodiments, a method implemented in a communication system including a host computer, a base station and a UE configured to selectively operate in one of two or more previously configured BWPs, each BWP being a different subset of an available bandwidth for uplink and/or downlink operation, the method comprising, at the host computer, providing user data and, at the host computer, initiating a transmission carrying the user data to the UE via a cellular network comprising the base station, where the method comprises, at the UE, receiving an indication to switch from use of a first BWP to a second BWP and upon switching to use of the second BWP, stopping operation of one or more physical layer procedures and waiting a predetermined time for receipt of a command activating and/or configuring the stopped one or more physical layer procedures for the second BWP. The method at the UE also comprises, upon failing to receive a command activating and/or configuring the stopped one or more physical layer procedures for the second BWP, within the predetermined time, switching to use of a default BWP of the two or more previously configured BWPs and applying a predetermined default configuration, corresponding to the default BWP, to one or more physical layer parameters and/or procedures. The method at the UE may further comprise receiving the user data from the base station.

According to some embodiments, a communication system including a host computer comprising a communication interface configured to receive user data originating from a transmission from a UE to a base station, the UE configured to selectively operate in one of two or more previously configured BWPs, each BWP being a different subset of an available bandwidth for uplink and/or downlink operation, and UE's processing circuitry configured to receive an indication to switch from use of a first BWP to a second BWP and, after switching to use of the second BWP, apply a predetermined default configuration, corresponding to the second BWP, to one or more physical layer parameters and/or procedures.

According to some embodiments, a communication system including a host computer comprising a communication interface configured to receive user data originating from a transmission from a UE to a base station, the UE configured to selectively operate in one of two or more previously configured BWPs, each BWP being a different subset of an available bandwidth for uplink and/or downlink operation, and UE's processing circuitry configured to receive an indication to switch from use of a first BWP to a second BWP, determine whether physical layer parameters and/or procedures for the second BWP have previously been configured by MAC CEs during prior use of the second BWP and apply the previously configured physical layer parameters and/or procedures for the second BWP upon determining that the physical layer parameters and/or procedures for the second BWP have previously been configured by MAC CEs during prior use of the second BWP.

According to some embodiments, a communication system including a host computer comprising a communication interface configured to receive user data originating from a transmission from a UE to a base station, the UE configured to selectively operate in one of two or more previously configured BWPs, each BWP being a different subset of an available bandwidth for uplink and/or downlink operation, and UE's processing circuitry configured to receive an indication to switch from use of a first BWP to a second BWP and, upon switching to use of the second BWP, stop operation of one or more physical layer procedures until receipt of a command activating and/or configuring the stopped one or more physical layer procedures for the second BWP.

According to some embodiments, a communication system including a host computer comprising a communication interface configured to receive user data originating from a transmission from a UE to a base station, the UE configured to selectively operate in one of two or more previously configured BWPs, each BWP being a different subset of an available bandwidth for uplink and/or downlink operation, and UE's processing circuitry configured to receive an indication to switch from use of a first BWP to a second BWP and, upon switching to use of the second BWP, stop operation of one or more physical layer procedures and waiting a predetermined time for receipt of a command activating and/or configuring the stopped one or more physical layer procedures for the second BWP. The UE's processing circuitry is also configured to, upon failing to receive a command activating and/or configuring the stopped one or more physical layer procedures for the second BWP, within the predetermined time, switch to use of a default BWP of the two or more previously configured BWPs and apply a predetermined default configuration, corresponding to the default BWP, to one or more physical layer parameters and/or procedures. The communication system may include the UE and/or the base station, wherein the base station comprises a radio interface configured to communicate with the UE and a communication interface configured to forward to the host computer the user data carried by a transmission from the UE to the base station. The processing circuitry of the host computer may be configured to execute a host application, and the UE's processing circuitry may be configured to execute a client application associated with the host application, thereby providing the user data. The processing circuitry of the host computer may be configured to execute a host application, thereby providing request data, and the UE's processing circuitry may be configured to execute a client application associated with the host application, thereby providing the user data in response to the request data.

According to some embodiments, a method implemented in a UE configured to selectively operate in one of two or more previously configured BWPs, each BWP being a different subset of an available bandwidth for uplink and/or downlink operation, the method comprising receiving an indication to switch from use of a first BWP to a second BWP and, after switching to use of the second BWP, applying a predetermined default configuration, corresponding to the second BWP, to one or more physical layer parameters and/or procedures.

According to some embodiments, a method implemented in a UE configured to selectively operate in one of two or more previously configured BWPs, each BWP being a different subset of an available bandwidth for uplink and/or downlink operation, the method comprising receiving an indication to switch from use of a first BWP to a second BWP and determining whether physical layer parameters and/or procedures for the second BWP have previously been configured by MAC CEs during prior use of the second BWP. The method further comprises applying the previously configured physical layer parameters and/or procedures for the second BWP upon determining that the physical layer parameters and/or procedures for the second BWP have previously been configured by MAC CEs during prior use of the second BWP.

According to some embodiments, a method implemented in a UE configured to selectively operate in one of two or more previously configured BWPs, each BWP being a different subset of an available bandwidth for uplink and/or downlink operation, the method comprising receiving an indication to switch from use of a first BWP to a second BWP and, upon switching to use of the second BWP, stopping operation of one or more physical layer procedures until receipt of a command activating and/or configuring the stopped one or more physical layer procedures for the second BWP.

According to some embodiments, a method implemented in a UE configured to selectively operate in one of two or more previously configured BWPs, each BWP being a different subset of an available bandwidth for uplink and/or downlink operation, the method comprising receiving an indication to switch from use of a first BWP to a second BWP and, upon switching to use of the second BWP, stopping operation of one or more physical layer procedures and waiting a predetermined time for receipt of a command activating and/or configuring the stopped one or more physical layer procedures for the second BWP. The method also comprises, upon failing to receive a command activating and/or configuring the stopped one or more physical layer procedures for the second BWP, within the predetermined time, switching to use of a default BWP of the two or more previously configured BWPs and applying a predetermined default configuration, corresponding to the default BWP, to one or more physical layer parameters and/or procedures. The method may include providing user data and forwarding the user data to a host computer via the transmission to the base station.

According to some embodiments, a method implemented in a communication system including a host computer, a base station and a UE configured to selectively operate in one of two or more previously configured BWPs, each BWP being a different subset of an available bandwidth for uplink and/or downlink operation, the method comprising. at the host computer, receiving user data transmitted to the base station from the UE, where the method comprises, at the UE, receiving an indication to switch from use of a first BWP to a second BWP and, after switching to use of the second BWP, applying a predetermined default configuration, corresponding to the second BWP, to one or more physical layer parameters and/or procedures.

According to some embodiments, a method implemented in a communication system including a host computer, a base station and a UE configured to selectively operate in one of two or more previously configured BWPs, each BWP being a different subset of an available bandwidth for uplink and/or downlink operation, the method comprising, at the host computer, receiving user data transmitted to the base station from the UE, where the method comprises, at the UE, determining whether physical layer parameters and/or procedures for the second BWP have previously been configured by MAC CEs during prior use of the second BWP. The method at the UE also comprises applying the previously configured physical layer parameters and/or procedures for the second BWP upon determining that the physical layer parameters and/or procedures for the second BWP have previously been configured by MAC CEs during prior use of the second BWP.

According to some embodiments, a method implemented in a communication system including a host computer, a base station and a UE configured to selectively operate in one of two or more previously configured BWPs, each BWP being a different subset of an available bandwidth for uplink and/or downlink operation, the method comprising, at the host computer, receiving user data transmitted to the base station from the UE, where the method comprises, at the UE, receiving an indication to switch from use of a first BWP to a second BWP and, upon switching to use of the second BWP, stopping operation of one or more physical layer procedures until receipt of a command activating and/or configuring the stopped one or more physical layer procedures for the second BWP.

According to some embodiments, a method implemented in a communication system including a host computer, a base station and a UE configured to selectively operate in one of two or more previously configured BWPs, each BWP being a different subset of an available bandwidth for uplink and/or downlink operation, the method comprising, at the host computer, receiving user data transmitted to the base station from the UE, where the method comprises, at the UE, receiving an indication to switch from use of a first BWP to a second BWP and, upon switching to use of the second BWP, stopping operation of one or more physical layer procedures and waiting a predetermined time for receipt of a command activating and/or configuring the stopped one or more physical layer procedures for the second BWP. The method also comprises, upon failing to receive a command activating and/or configuring the stopped one or more physical layer procedures for the second BWP, within the predetermined time, switching to use of a default BWP of the two or more previously configured BWPs and applying a predetermined default configuration, corresponding to the default BWP, to one or more physical layer parameters and/or procedures. The method may further comprise, at the UE, providing the user data to the base station. The method may comprise, at the UE, executing a client application, thereby providing the user data to be transmitted, and at the host computer, executing a host application associated with the client application. The method may include, at the UE, executing a client application and receiving input data to the client application, the input data being provided at the host computer by executing a host application associated with the client application, where the user data to be transmitted is provided by the client application in response to the input data.

According to some embodiments, a communication system including a host computer comprising a communication interface configured to receive user data originating from a transmission from a UE to a base station, the UE configured to selectively operate in one of two or more previously configured BWPs, each BWP being a different subset of an available bandwidth for uplink and/or downlink operation, where the base station comprises a radio interface and processing circuitry configured to send, to the UE, an indication to switch from use of a first BWP to a second BWP, count a number of physical layer reports expected from the UE during use of the second BWP but not received and, responsive to the number reaching a predetermined limit, send one or more MAC CEs to configure physical layer reporting for the second BWP. The communication system may further include the base station and/or the UE, where the UE is configured to communicate with the base station. The processing circuitry of the host computer may be configured to execute a host application, and the UE may be configured to execute a client application associated with the host application, thereby providing the user data to be received by the host computer.

According to some embodiments, a method implemented in a communication system including a host computer, a base station and a UE configured to selectively operate in one of two or more previously configured BWPs, each BWP being a different subset of an available bandwidth for uplink and/or downlink operation, the method comprising, at the host computer, receiving, from the base station, user data originating from a transmission which the base station has received from the UE, where the method at the UE comprises receiving an indication to switch from use of a first BWP to a second BWP and, after switching to use of the second BWP, applying a predetermined default configuration, corresponding to the second BWP, to one or more physical layer parameters and/or procedures.

According to some embodiments, a method implemented in a communication system including a host computer, a base station and a UE configured to selectively operate in one of two or more previously configured BWPs, each BWP being a different subset of an available bandwidth for uplink and/or downlink operation, the method comprising, at the host computer, receiving, from the base station, user data originating from a transmission which the base station has received from the UE, where the method at the UE comprises receiving an indication to switch from use of a first BWP to a second BWP and determining whether physical layer parameters and/or procedures for the second BWP have previously been configured by MAC CEs during prior use of the second BWP. The method at the UE also comprises applying the previously configured physical layer parameters and/or procedures for the second BWP upon determining that the physical layer parameters and/or procedures for the second BWP have previously been configured by MAC CEs during prior use of the second BWP.

According to some embodiments, a method implemented in a communication system including a host computer, a base station and a UE configured to selectively operate in one of two or more previously configured BWPs, each BWP being a different subset of an available bandwidth for uplink and/or downlink operation, the method comprising, at the host computer, receiving, from the base station, user data originating from a transmission which the base station has received from the UE, where the method at the UE comprises receiving an indication to switch from use of a first BWP to a second BWP and, upon switching to use of the second BWP, stopping operation of one or more physical layer procedures until receipt of a command activating and/or configuring the stopped one or more physical layer procedures for the second BWP.

According to some embodiments, a method implemented in a communication system including a host computer, a base station and a UE configured to selectively operate in one of two or more previously configured BWPs, each BWP being a different subset of an available bandwidth for uplink and/or downlink operation, the method comprising, at the host computer, receiving, from the base station, user data originating from a transmission which the base station has received from the UE, where the method at the UE comprises receiving an indication to switch from use of a first BWP to a second BWP and, upon switching to use of the second BWP, stopping operation of one or more physical layer procedures and waiting a predetermined time for receipt of a command activating and/or configuring the stopped one or more physical layer procedures for the second BWP. The method at the UE also comprises, upon failing to receive a command activating and/or configuring the stopped one or more physical layer procedures for the second BWP, within the predetermined time, switching to use of a default BWP of the two or more previously configured BWPs and applying a predetermined default configuration, corresponding to the default BWP, to one or more physical layer parameters and/or procedures. The method may include, at the base station, receiving the user data from the UE, and, at the base station, initiating a transmission of the received user data to the host computer.

As discussed in detail above, the techniques described herein, e.g., as illustrated in the process flow diagrams of FIGS. 6 and 8-11, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 18:
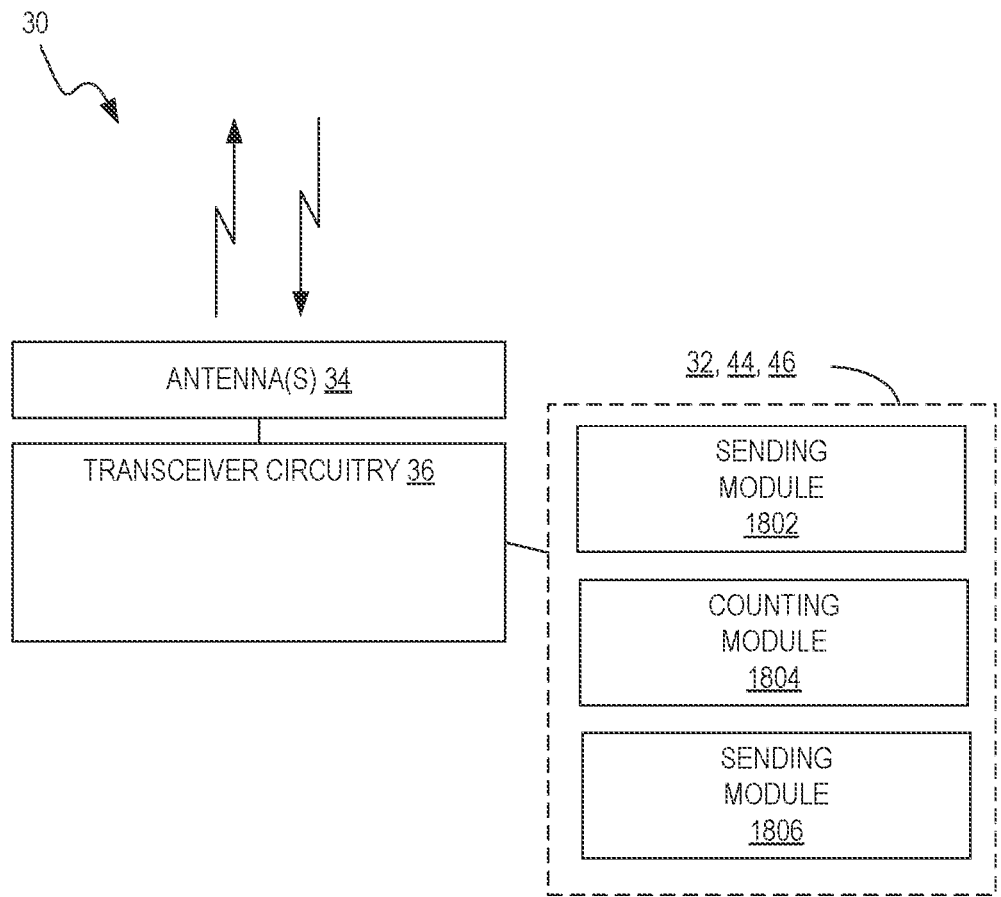
FIG. 18 is a block diagram illustrating a functional implementation of a network node, according to some embodiments.

FIG. 18 illustrates an example functional module or circuit architecture as may be implemented in the network node 30. In FIG. 18, network node 30 includes a sending module 1802, a counting module 1804, and a sending module 2206, which are implemented in a processing circuit 32, e.g., as illustrated in FIG. 5, and more particularly using computer program code 46 stored in memory 44, again as illustrated in FIG. 5. Each of functional components 1802, 1804, and 1806 may thus be understood as comprising a functional module of code, or as comprising a processing circuit coupled with a memory storing such code—in some embodiments, these functional components will be implemented in a single processing circuit, but the functional modules may be split among several processing circuits in other embodiments.

The functional implementation shown in FIG. 18 includes a sending module 1802 for sending, to a wireless device 50, an indication to switch from use of a first BWP to a second BWP. The implementation includes a counting module 1804 for counting a number of physical layer reports expected from the wireless device during use of the second BWP but not received. The implementation includes a sending module 1806 for, responsive to the number reaching a predetermined limit, sending one or more MAC CEs to configure physical layer reporting for the second BWP.

Figure 19:
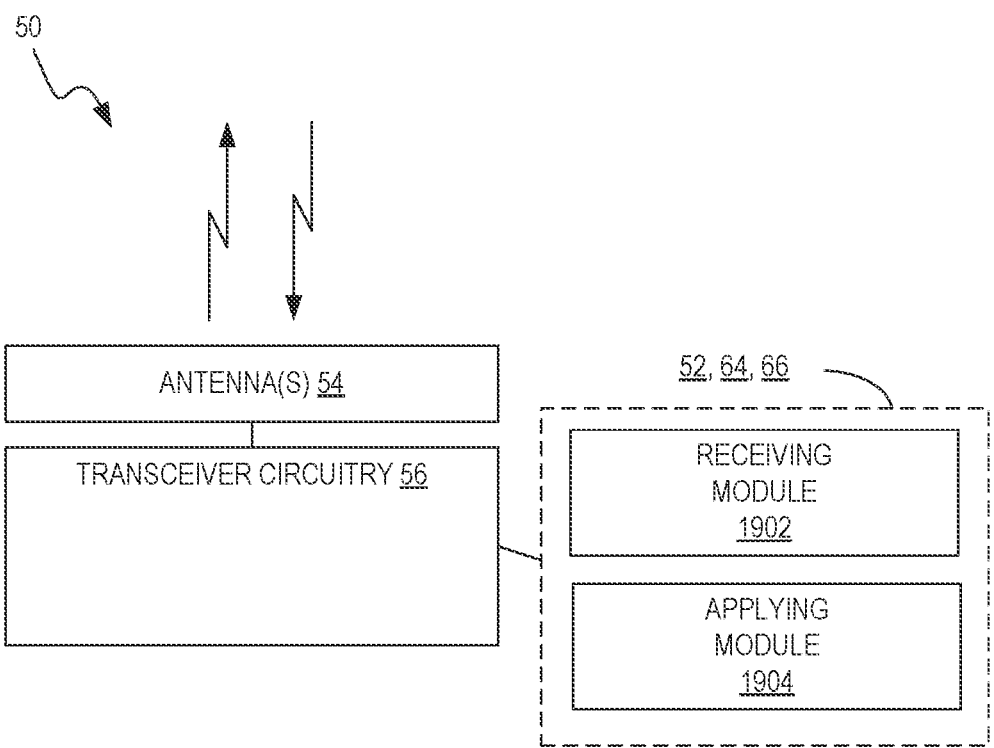
FIGS. 19-22 are block diagrams illustrating functional implementations of a wireless device, according to some embodiments.

FIG. 19 illustrates an example functional module or circuit architecture as may be implemented in the wireless device 50. In FIG. 19, wireless device 50 includes a receiving module 1902 and an applying module 1904, which are implemented in a processing circuit 52, e.g., as illustrated in FIG. 7, and more particularly using computer program code 66 stored in memory 64, again as illustrated in FIG. 7. Each of functional components 1902 and 1904 may thus be understood as comprising a functional module of code, or as comprising a processing circuit coupled with a memory storing such code—in some embodiments, these functional components will be implemented in a single processing circuit, but the functional modules may be split among several processing circuits in other embodiments.

The functional implementation shown in FIG. 19 includes a receiving module 1902 for receiving an indication to switch from use of a first BWP to a second BWP, and an applying module 1904 for, after switching to use of the second BWP, applying a predetermined default configuration, corresponding to the second BWP, to one or more physical layer parameters and/or procedures.

Figure 20:
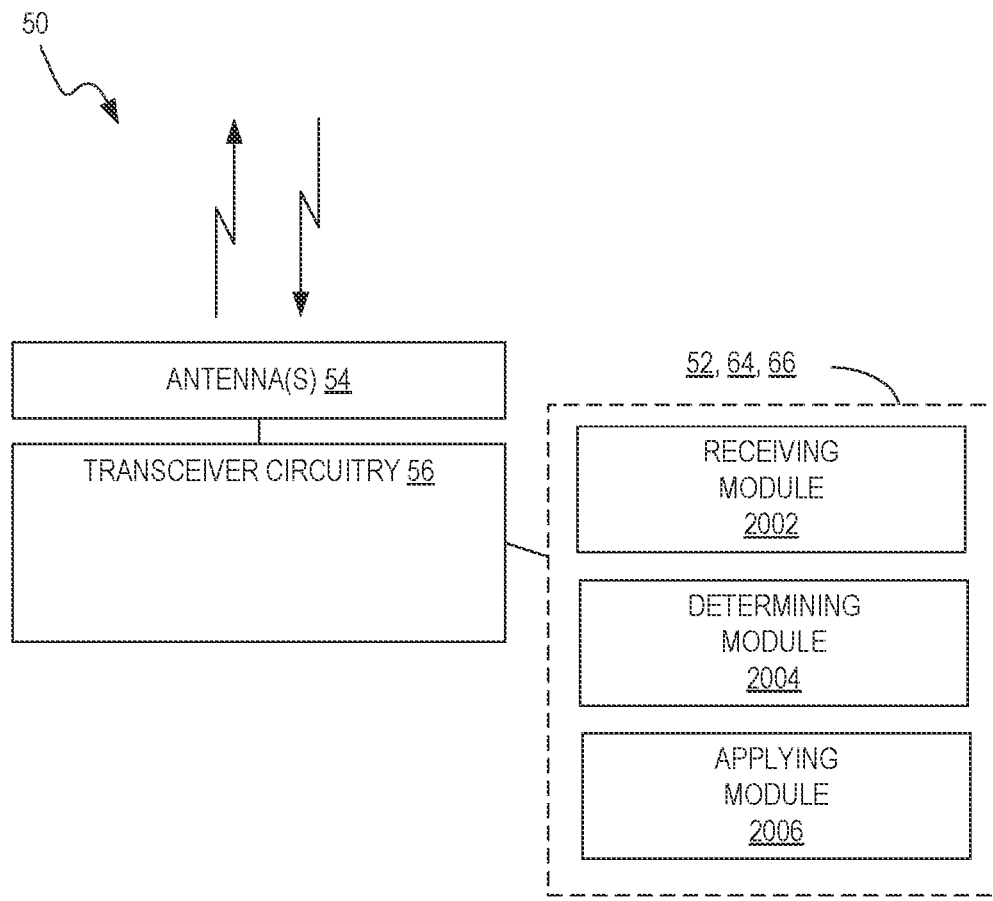

FIG. 20 illustrates an example functional module or circuit architecture, again as may be implemented in the wireless device 50. In FIG. 20, wireless device 50 includes a receiving module 2002, a determining module 2004, and an applying module 2006, which are implemented in a processing circuit 52, e.g., as illustrated in FIG. 7, and more particularly using computer program code 66 stored in memory 64, again as illustrated in FIG. 7. Each of functional components 2002, 2004, and 2006 may thus be understood as comprising a functional module of code, or as comprising a processing circuit coupled with a memory storing such code—in some embodiments, these functional components will be implemented in a single processing circuit, but the functional modules may be split among several processing circuits in other embodiments.

The implementation shown in FIG. 20 includes a receiving module 2002 for receiving an indication to switch from use of a first BWP to a second BWP and a determining module 2004 for determining whether physical layer parameters and/or procedures for the second BWP have previously been configured by MAC CEs during prior use of the second BWP. The implementation also includes an applying module 2006 for applying the previously configured physical layer parameters and/or procedures for the second BWP upon determining that the physical layer parameters and/or procedures for the second BWP have previously been configured by MAC CEs during prior use of the second BWP.

Figure 21:
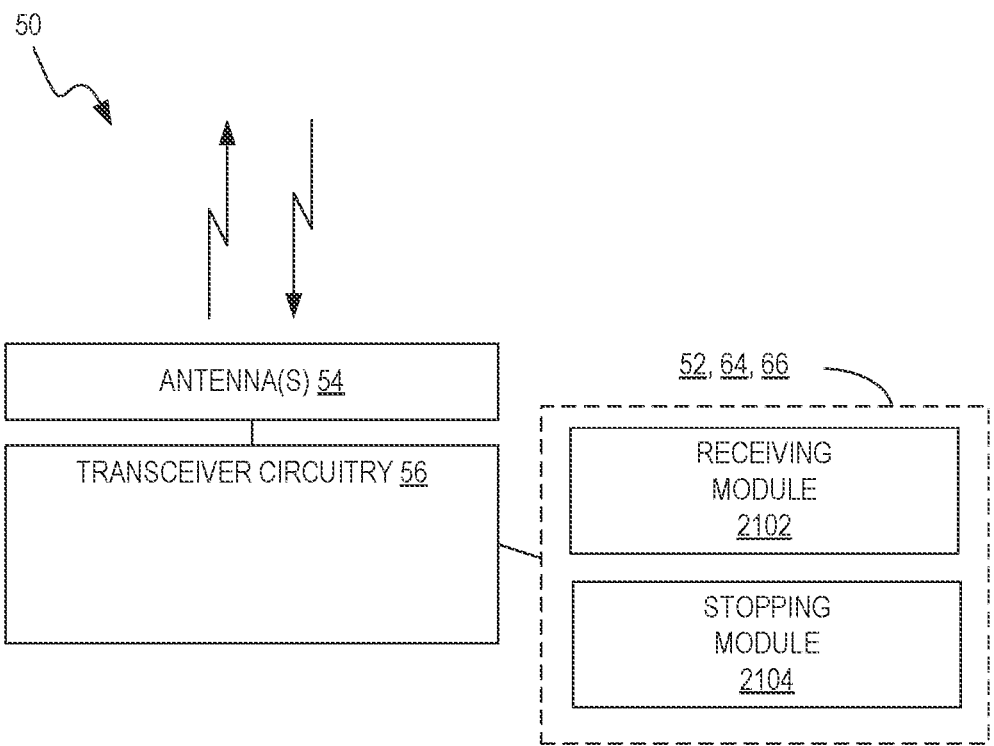

FIG. 21 illustrates another example functional module or circuit architecture as may be implemented in the wireless device 50. In FIG. 21, wireless device 50 includes a receiving module 2102 and a stopping module 2204, which are implemented in a processing circuit 52, e.g., as illustrated in FIG. 7, and more particularly using computer program code 66 stored in memory 64, again as illustrated in FIG. 7. Each of functional components 2102 and 2104 may thus be understood as comprising a functional module of code, or as comprising a processing circuit coupled with a memory storing such code—in some embodiments, these functional components will be implemented in a single processing circuit, but the functional modules may be split among several processing circuits in other embodiments.

The implementation shown in FIG. 21 includes a receiving module 2102 for receiving an indication to switch from use of a first BWP to a second BWP and a stopping module 2104 for, upon switching to use of the second BWP, stopping operation of one or more physical layer procedures until receipt of a command activating and/or configuring the stopped one or more physical layer procedures for the second BWP.

Figure 22:
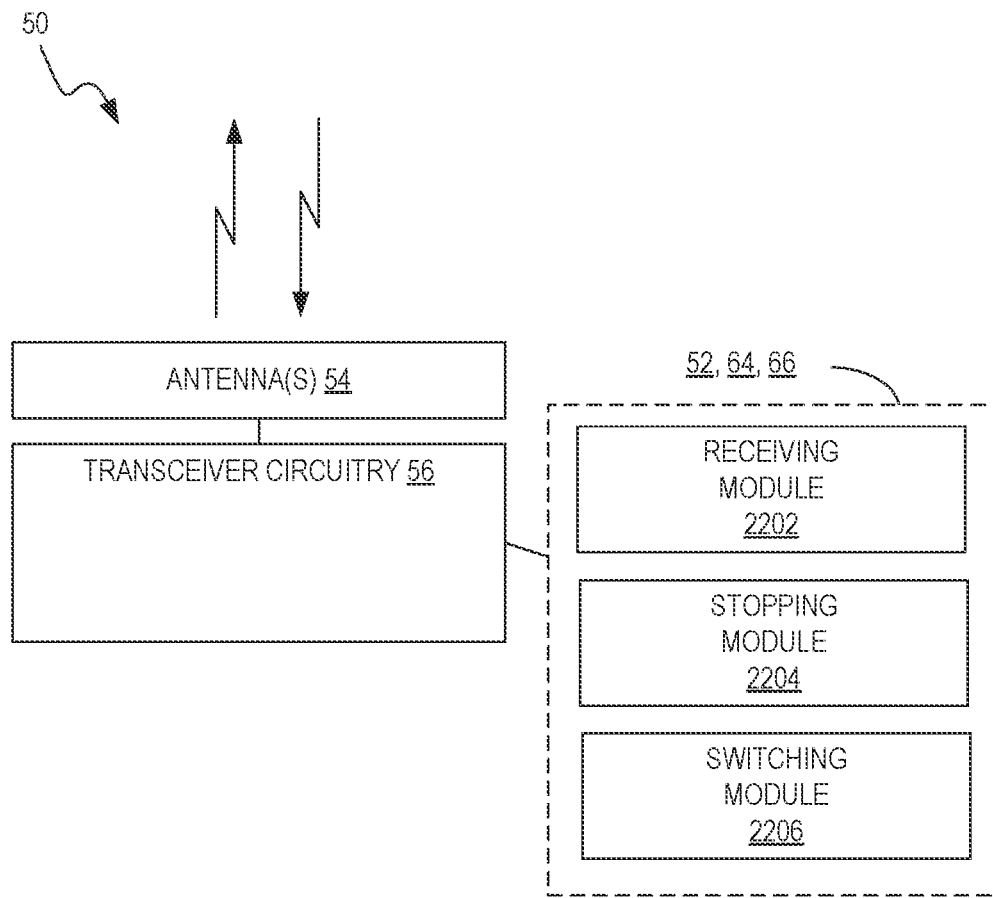

FIG. 22 illustrates still another example functional module or circuit architecture as may be implemented in the wireless device 50. In FIG. 22, wireless device 50 includes a receiving module 2202, a stopping module 2204, and switching module 2206, which are implemented in a processing circuit 52, e.g., as illustrated in FIG. 7, and more particularly using computer program code 66 stored in memory 64, again as illustrated in FIG. 7. Each of functional components 2202, 2204, and 2206 may thus be understood as comprising a functional module of code, or as comprising a processing circuit coupled with a memory storing such code—in some embodiments, these functional components will be implemented in a single processing circuit, but the functional modules may be split among several processing circuits in other embodiments.

The implementation shown in FIG. 22 includes a receiving module 2202 for receiving an indication to switch from use of a first BWP to a second BWP and a stopping module 2204 for, upon switching to use of the second BWP, stopping operation of one or more physical layer procedures and waiting a predetermined time for receipt of a command activating and/or configuring the stopped one or more physical layer procedures for the second BWP. The implantation also includes a switching module 2206 for, upon failing to receive a command activating and/or configuring the stopped one or more physical layer procedures for the second BWP, within the predetermined time, switching to use of a default BWP of the two or more previously configured BWPs and applying a predetermined default configuration, corresponding to the default BWP, to one or more physical layer parameters and/or procedures.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

What is claimed is:

1. A method, in a wireless device configured to selectively operate in one of two or more previously configured bandwidth parts (BWPs), each BWP being a different subset of an available bandwidth for uplink and/or downlink operation, the method comprising:
    switching from use of a first BWP to a second BWP; and
    after switching to use of the second BWP, applying a predetermined default configuration, corresponding to the second BWP, to one or more physical layer parameters and/or procedures.

2. The method of claim 1, wherein the predetermined default configuration is one of a plurality of predetermined default configurations, each of the predetermined default configurations uniquely corresponding to a respective one of the previously configured BWPs.

3. The method of claim 1, wherein the predetermined default configuration is a common default configuration corresponding to two or more of the previously configured BWPs, including the second BWP.

4. The method of claim 1, wherein the method comprises applying the predetermined default configuration immediately upon switching to use of the second BWP.

5. The method of claim 1, wherein the method further comprises:
    upon switching to use of the second BWP, stopping operation of one or more physical layer procedures;
    waiting a predetermined time for receipt of a command activating and/or configuring the stopped one or more physical layer procedures for the second BWP; and
    applying the predetermined default configuration upon failing to receive a command activating and/or configuring the stopped one or more physical layer procedures for the second BWP, within the predetermined time.

6. The method of claim 1, wherein the method further comprises:
    upon switching to use of the second BWP, determining whether physical layer parameters and/or procedures for the second BWP have previously been configured by medium access control (MAC) control elements (CEs) during prior use of the second BWP; and applying the predetermined default configuration upon determining that physical layer parameters and/or procedures for the second BWP have not previously been configured by MAC CEs during prior use of the second BWP.

7. The method of claim 1, wherein the method further comprises:

upon switching to use of the second BWP, determining whether physical layer parameters and/or procedures for the second BWP have previously been configured by medium access control (MAC) control elements (CEs) during prior use of the second BWP and within a predetermined interval prior to said switching; and applying the predetermined default configuration upon determining that physical layer parameters and/or procedures for the second BWP have not previously been configured by MAC CEs during prior use of the second BWP and within the predetermined interval.

8. The method of claim 1, wherein the method further comprises:

upon switching to use of the second BWP, determining whether physical layer parameters and/or procedures for the second BWP have previously been configured by medium access control (MAC) control elements (CEs) during prior use of the second BWP that occurred without either a change in state from active to idle or a handover; and applying the predetermined default configuration upon determining that physical layer parameters and/or procedures for the second BWP have not previously been configured by MAC CEs during prior use of the second BWP that occurred without either a change in state from active to idle or a handover.

9. The method of claim 1, wherein the method further comprises:

subsequently to applying the predetermined default configuration, receiving a command activating and/or configure one or more physical layer procedures for the second BWP; and performing the one or more physical layer procedures according to the received command.

10. The method of claim 1, wherein the one or more physical layer parameters and/or procedures include any one or more of the following:

channel-state information (CSI) reporting;
interference measurement reporting; and
sounding reference signal (SRS) configuration parameters.

11. A method, in a wireless device configured to selectively operate in one of two or more previously configured bandwidth parts (BWPs), each BWP being a different subset of an available bandwidth for uplink and/or downlink operation, the method comprising:

switching from use of a first BWP to a second BWP;

determining whether physical layer parameters and/or procedures for the second BWP have previously been configured by medium access control (MAC) control elements (CEs) during prior use of the second BWP; and applying the previously configured physical layer parameters and/or procedures for the second BWP upon determining that the physical layer parameters and/or procedures for the second BWP have previously been configured by MAC CEs during prior use of the second BWP.

12. The method of claim 11, wherein applying the previously configured physical layer parameters and/or procedures for the second BWP is further conditioned upon determining that these previously configured physical layer parameters and/or procedures for the second BWP were configured within a predetermined time interval prior to switching from the first BWP to the second BWP.

13. The method of claim 11, wherein applying the previously configured physical layer parameters and/or procedures for the second BWP is further conditioned upon determining that no change from active state to idle state and/or no handover has occurred since the previously configured physical layer parameters and/or procedures for the second BWP were configured.

14. A method, in a wireless device configured to selectively operate in one of two or more previously configured bandwidth parts (BWPs), each BWP being a different subset of an available bandwidth for uplink and/or downlink operation, the method comprising:

switching from use of a first BWP to a second BWP; and upon switching to use of the second BWP, stopping operation of one or more physical layer procedures until receipt of a command activating and/or configuring the stopped one or more physical layer procedures for the second BWP.

15. A method, in a wireless device configured to selectively operate in one of two or more previously configured bandwidth parts (BWPs), each BWP being a different subset of an available bandwidth for uplink and/or downlink operation, the method comprising:

switching from use of a first BWP to a second BWP; and upon switching to use of the second BWP, stopping operation of one or more physical layer procedures and waiting a predetermined time for receipt of a command activating and/or configuring the stopped one or more physical layer procedures for the second BWP; and upon failing to receive a command activating and/or configuring the stopped one or more physical layer procedures for the second BWP, within the predetermined time, switching to use of a default BWP of the two or more previously configured BWPs and applying a predetermined default configuration, corresponding to the default BWP, to one or more physical layer parameters and/or procedures.

* * * * *